US008617708B2

(12) United States Patent
Murakami

(10) Patent No.: US 8,617,708 B2
(45) Date of Patent: Dec. 31, 2013

(54) METHACRYLIC RESIN, MOLDED ARTICLE THEREOF, AND METHOD FOR PRODUCING METHACRYLIC RESIN

(75) Inventor: Fumiki Murakami, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 0 days.

(21) Appl. No.: 13/394,781

(22) PCT Filed: Oct. 22, 2010

(86) PCT No.: PCT/JP2010/068705
§ 371 (c)(1),
(2), (4) Date: Apr. 12, 2012

(87) PCT Pub. No.: WO2011/049203
PCT Pub. Date: Apr. 28, 2011

(65) Prior Publication Data
US 2012/0196127 A1    Aug. 2, 2012

(30) Foreign Application Priority Data

Oct. 22, 2009  (JP) ................ 2009-243856
Nov. 13, 2009  (JP) ................ 2009-260278
Dec. 25, 2009  (JP) ................ 2009-295847

(51) Int. Cl.
*B32B 5/16*   (2006.01)
*C08L 33/12*  (2006.01)

(52) U.S. Cl.
USPC ............ 428/402; 428/407; 525/226; 525/228

(58) Field of Classification Search
USPC ............ 428/402, 407; 427/212; 525/228, 226
See application file for complete search history.

(56) References Cited

U.S. PATENT DOCUMENTS

| 6,252,002 B1* | 6/2001 | Yamada et al. ............... 525/228 |
| 2004/0043964 A1 | 3/2004 | Gomi et al. |
| 2007/0112096 A1* | 5/2007 | Kasai et al. .................. 523/201 |
| 2009/0036559 A1* | 2/2009 | Cui ............................... 521/60 |
| 2009/0239050 A1* | 9/2009 | Azuma et al. ................ 428/220 |

FOREIGN PATENT DOCUMENTS

| CA | 2224850 A1 | 6/1998 |
| EP | 1953177 * | 8/2008 |
| EP | 1953177 A2 | 8/2008 |
| JP | 1-22865 B2 | 4/1989 |
| JP | 4-277545 A | 10/1992 |
| JP | 9-207196 A | 8/1997 |
| JP | 10-17626 A | 1/1998 |
| JP | 10-174933 A | 6/1998 |
| JP | 10-309717 A | 11/1998 |
| JP | 2000-256527 A | 9/2000 |
| JP | 2000-309601 A | 11/2000 |
| JP | 2001-151827 A | 6/2001 |
| JP | 2001-207086 A | 7/2001 |
| JP | 2002-128803 A | 5/2002 |
| JP | 2006-241226 A | 9/2006 |
| JP | 2007-291230 A | 11/2007 |
| SG | 79213 A1 | 3/2001 |
| TW | I290471 B | 12/2007 |
| WO | WO 2005/012425 A1 | 2/2005 |
| WO | WO 2007/060891 A2 | 5/2007 |

OTHER PUBLICATIONS

Japanese Office Action dated Dec. 3, 2012, for Japanese Application No. 2010-237557.
Japanese Office Action dated Dec. 4, 2012, for Japanese Application No. 2012-188886.
European Search Report dated Jan. 7, 2013 for European Application No. 10825052.3.
Japanese Notice of Information Submission dated Jan. 7, 2013 for Japanese Application No. 2010-237557.
Japanese Office Action dated Apr. 23, 2012, for Application No. 2009-260278.
International Preliminary Report on Patentability and translation of Written Opinion of the International Searching Authority, dated May 24, 2012, for International Application No. PCT/JP2010/068705.
Taiwanese Office Action for Taiwanese Application No. 099136204 dated May 10, 2013.
Tosoh, "Improvement in Accuracy of SEC Measurement (GPC-8020's Function of Internal . . . )", http://www.separations.asia.tosohbioscience.com/NR/rdonlyres/46E81836-BB56-4333-8554-63A5DA92D415/0/106.pdf (retrieved from Internet Apr. 11, 2013), 6 pages provided (with English translation).
Japanese Office Action mailed Sep. 2, 2013 for Japanese Application No. 2010-237557.

* cited by examiner

*Primary Examiner* — Leszek Kiliman
(74) *Attorney, Agent, or Firm* — Birch, Stewart, Kolasch & Birch, LLP

(57) ABSTRACT

A methacrylic resin, including 80 to 99.5% by mass of a methacrylic acid ester monomer unit, and 0.5 to 20% by mass of other vinyl monomer unit which is copolymerizable with at least one of the methacrylic acid ester, wherein the methacrylic resin satisfies the following conditions (I) to (III):
(I) having a weight average molecular weight measured by gel permeation chromatography (GPC) of 60,000 to 300,000;
(II) having a content of a molecular weight component 1/5 or less the peak molecular weight (Mp) obtained from a GPC elution curve, said content being 7 to 40% based on a region area ratio obtained from the GPC elution curve; and
(III) having an angle of repose of 20 to 40°.

13 Claims, 4 Drawing Sheets

METHACRYLIC RESIN, MOLDED ARTICLE THEREOF, AND METHOD FOR PRODUCING METHACRYLIC RESIN

TECHNICAL FIELD

The present invention relates to a methacrylic resin, a molded article thereof, and a method for producing a methacrylic resin.

BACKGROUND ART

Methacrylic resins, represented by poly(methyl methacrylate) (PMMA), are used in a wide variety of fields due to their high transparency, such as optical materials, automotive parts, building materials, lenses, household goods, OA equipment, and lighting devices.

Especially, recently their use in automotive applications and optical materials such as light guide plates and films for liquid crystal displays is progressing, and there are increasing expectations for applications that were said to be difficult to carry out molding and processing with conventional methacrylic resins.

For example, when injection molding a large-size, thin molded article, if the fluidity of the resin is poor, molding will be impossible due to insufficient injection pressure, and distortion of the molded article will increase. Consequently, a high fluidity that allows molding is desirable even if the injection pressure is low. On the other hand, there is a need for further improvement in solvent resistance and mechanical strength while maintaining the colorless transparency that methacrylic resins have and the processability of the obtained resins.

Conventionally, generally known methods for improving the mechanical strength and molding properties of a methacrylic resin have included conferring fluidity with a low molecular weight methacrylic resin, and conferring mechanical strength with a methacrylic resin having a high molecular weight or a densely crosslinked structure.

Reports related to this have included a technology that melt-mixes a high molecular weight and a low molecular weight methacrylic resin (e.g., Patent document 1), a technology that co-polymerizes a methacrylic resin formed by a low molecular weight methacrylic resin with a large amount of another vinyl monomer (e.g., Patent document 2), a technology that enlarges the molecular weight distribution by producing a densely cross-linked methacrylic resin using a polyfunctional monomer (e.g., Patent document 3), and a technology that, while maintaining mechanical strength, improves fluidity as compared to a conventional methacrylic resin by using a multistage polymerization method (e.g., Patent document 4).

CITATION LIST

Patent Document

Patent document 1: Japanese Patent Publication No. 1-22865
Patent document 2: Japanese Patent Laid-Open No. 4-277545
Patent document 3: Japanese Patent Laid-Open No. 9-207196
Patent document 4: WO 2007/060891 Pamphlet

SUMMARY OF INVENTION

Problems to be Solved by the Invention

However, in the invention described in Patent document 1, two methacrylic resins having different molecular weights are separately polymerized and mixed. Consequently, there is the problem of unevenness in the molecular weight at some portions due to insufficient mixing, so that the strands are unstable during extrusion.

Further, in the invention described in Patent document 2, the fluidity of the obtained methacrylic resin is not sufficient. Thus, there is the problem that if the amount of the other vinyl monomer that is copolymerizable with methyl methacrylate is increased in order to improve fluidity, heat resistance and mechanical strength tend to deteriorate, so that a good balance among fluidity, mechanical strength, and heat resistance cannot be conferred.

In addition, in the invention described in Patent document 3, there is the problem that if the polyfunctional monomer amount is too large, mixing uniformity deteriorates, so that the appearance of the molded article deteriorates, while if the polyfunctional monomer amount is too small, the effects of an improvement in fluidity and maintaining mechanical strength are not exhibited, and yet control of the polyfunctional monomer is very difficult.

Still further, in the invention described in Patent document 4, although the fluidity of the obtained polymer is good, the specific surface area of the resin obtained by polymerization tends to increase, and electrical charge due to static electricity tends to occur. Moreover, the angle of repose of the resin particles obtained by polymerization is large, so that when the resin is charged into a hopper during an extrusion or molding operation, the polymer is not stably added. This can cause problems such as the extruded strands breaking or the resin not being able to be added unless the hopper is hit in a suitable manner or subjected to some other shock. Further, agglomerates derived from the resin particles adhering to each other, for example, can form. If the amount of agglomerates increases, not only does this cause the yield to decrease, but can also lead to other problems such as productivity decreasing due to blockages caused by the agglomerates clogging up the insides of the pipes and a deterioration in the color hue of the obtained resin.

In view of the above-described problems in the conventional art, it is an object of the present invention to provide a methacrylic resin that has excellent colorless transparency, high fluidity of a melt resin, high impact resistance, and solvent resistance, as well as having a low agglomerate content and a small angle of repose of the resin particles.

Means for Solving the Problems

As a result of diligent research in order to resolve the above-described problems in the conventional art, the present inventors completed the present invention.

Specifically, the present invention is as follows.

[1]
A methacrylic resin, comprising:
80 to 99.5% by mass of a methacrylic acid ester monomer unit; and
0.5 to 20% by mass of other vinyl monomer unit which is copolymerizable with at least one of the methacrylic acid ester,
wherein the methacrylic resin satisfies the following conditions (I) to (III):
(I) having a weight average molecular weight measured by gel permeation chromatography (GPC) of 60,000 to 300,000;
(II) having a content of a molecular weight component 1/5 or less a peak molecular weight (Mp) obtained from a GPC elution curve, said content being 7 to 40% based on a region area ratio obtained from the GPC elution curve; and
(III) having an angle of repose of 20 to 40°.

[2]

The methacrylic resin according to the above [1], wherein, using four 3 mm thick, 20 mm wide, and 220 mm long test pieces formed from the methacrylic resin laminated over each other, a yellowness index difference in a length direction when measured based on JIS T7105 is 30 or less.

[3]

The methacrylic resin according to the above [1] or [2], wherein the methacrylic resin has a moisture content measured by a Karl Fischer method of 0.1 to 1.0% by mass.

[4]

The methacrylic resin according to any one of the above [1] to [3], wherein a content of a component having a molecular weight measured by gel permeation chromatography (GC) of 10,000 or less is 1 to 10% based on a region area ratio obtained from a GPC elution curve.

[5]

The methacrylic resin according to any one of the above [1] to [4], wherein an average composition ratio Mh (% by mass) of the other vinyl monomer unit which is copolymerizable with the methacrylic acid ester in the methacrylic resin having a molecular weight component for which a cumulative region area of the region area obtained from the GPC elution curve is 0 to 2%, and an average composition ratio (Ml) (% by mass) of the other vinyl monomer unit which is copolymerizable with the methacrylic acid ester in the methacrylic resin having a molecular weight component for which the cumulative region area is 98 to 100%, the Mh and the Ml satisfy a relationship of the following relational expression (1):

$$(Mh-0.8) \geq Ml \geq 0 \tag{1}$$

[6]

The methacrylic resin according to any one of the above [1] to [5], wherein the methacrylic resin has an average particle size of 0.1 or more and 10 mm or less.

[7]

The methacrylic resin according to any one of the above [1] to [6], wherein a content of components in the methacrylic resin having a particle size of less than 0.15 mm is 0.01 to 10% by mass.

[8]

The methacrylic resin according to any one of the above [1] to [7], wherein a content of an agglomerate is 1.2% by mass or less.

[9]

A molded article obtained by molding the methacrylic resin according to any one of the above [1] to [8].

[10]

A method for producing a methacrylic acid ester monomer-containing methacrylic resin according to any one of the above [1] to [8], the method comprising the steps of:

producing, based on the whole methacrylic resin, 5 to 45% by mass of a polymer (I) from a methacrylic acid ester monomer-containing raw material mixture, the polymer (I) having an weight average molecular weight of 5,000 to 50,000 measured by gel permeation chromatography; and producing, based on the whole methacrylic resin, 95 to 55% mass of a polymer (II) having an weight average molecular weight of 60,000 to 350,000 by further adding, in the presence of the polymer (I), a methacrylic acid ester monomer-containing raw material mixture, wherein when a time from adding the raw material mixture of polymer (I) until observing an exothermic peak temperature from heat generated by polymerization is (T1), and a time from adding the raw material mixture of polymer (II) until observing an exothermic peak temperature from heat generated by polymerization is (T2), the following expression (6) holds true:

$$0.6 < T2/T \leq 5 \tag{6}$$

The method for producing the methacrylic resin according to the above [10], wherein a composition ratio Ma1 (% by mass) of the other vinyl monomer which is copolymerizable with a methacrylic acid ester in polymer (I), and a composition ratio Mah (% by mass) of the other vinyl monomer unit which is copolymerizable with a methacrylic acid ester in polymer (II), the Ma1 and the Mah satisfy a relationship of the following expression (4):

$$(Mah-0.8) \geq Ma1 \geq 0 \tag{4}$$

The method for producing the methacrylic resin according to the above [10] or [11], wherein the polymer (I) substantially does not comprise the other vinyl monomer unit which is copolymerizable.

Advantageous Effects of Invention

According to the present invention, a methacrylic resin, and a molding article thereof, that has excellent colorless transparency, high fluidity, high impact resistance, and solvent resistance, as well as having a low agglomerate content, a small angle of repose of the resin particles, and excellent handleability can be obtained.

MODE FOR CARRYING OUT THE INVENTION

Figure 1:
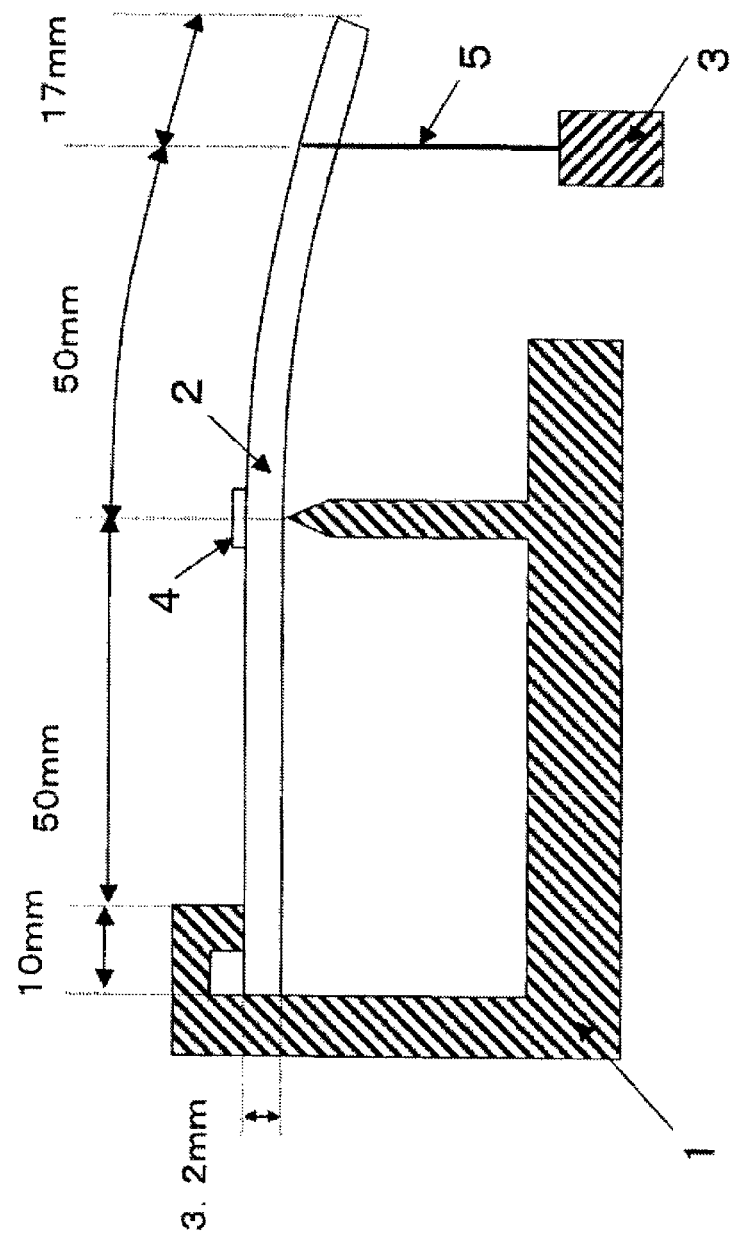
FIG. 1 illustrates a schematic diagram of a solvent resistance test performed by a cantilever method.

An embodiment for carrying out the present invention (hereinafter referred to as "present embodiment") will now be described in detail. However, the present invention is not limited to the following description. The present invention can be carried out with various modifications within the gist thereof.

Further, in the following, the constituent units forming a polymer will be referred to as "monomer unit".

[Methacrylic Resin]

The methacrylic resin according to the present embodiment includes 80 to 99.5% by mass of a methacrylic acid ester monomer unit and 0.5 to 20% by mass of other vinyl monomer unit which is copolymerizable with at least one methacrylic acid ester, and satisfies the following conditions.

(I) having a weight average molecular weight measured by gel permeation chromatography (GPC) of 60,000 to 300,000;
(II) having a content of a component that has a molecular weight 1/5 or less the peak molecular weight (Mp) obtained from a GPC elution curve, said content being 7 to 40% based on a region area ratio obtained from the GPC elution curve;
(III) having an angle of repose of 20 to 40°.

(Methacrylic Acid Ester Monomer)

As the methacrylic acid ester monomer constituting the methacrylic resin according to the present embodiment, monomers represented by the following general formula (I) can be preferably used.

[Formula 1]

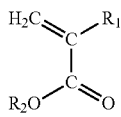

(i)

In the above formula, $R_1$ represents a methyl group.

Further, $R_2$ represents a group having 1 to 12 carbon atoms, preferably a hydrocarbon group having 1 to 12 carbon atoms, and may have a hydroxyl group on a carbon.

Examples of the methacrylic acid ester monomer represented by general formula (I) include butyl methacrylate, ethyl methacrylate, methyl methacrylate, propyl methacrylate, isopropyl methacrylate, cyclohexyl methacrylate, phenyl methacrylate, (2-ethylhexyl) methacrylate, (t-butyl cyclohexyl) methacrylate, benzyl methacrylate, and (2,2,2-trifluoroethyl) methacrylate. From the perspective of availability and the like, it is especially preferred to use methyl methacrylate.

One of the above-described methacrylate monomers may be used alone, or two or more may be used together.

Further, the same methacrylic acid ester monomer may be included in the below-described polymer (I) and polymer (II), or different methacrylic acid ester monomers may be included.

The methacrylic resin according to the present embodiment includes 80 to 99.5% by mass of the methacrylic acid ester monomer unit, preferably 85 to 99.5% by mass, more preferably 90 to 99% by mass, still more preferably 92 to 99.3% by mass, even more preferably 92 to 99% by mass, and still even more preferably 94 to 99% by mass.

(Other Vinyl Monomer)

As the other vinyl monomer which is copolymerizable with the above-described methacrylic acid ester, an acrylic acid ester monomer represented by the following general formula (II) can be preferably used.

[Formula 2]

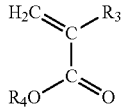

(ii)

In general formula (II), $R_3$ represents a hydrogen atom, and $R_4$ represents an alkyl group having 1 to 18 carbon atoms.

Examples of the other vinyl monomer represented by general formula (II) which is copolymerizable with the methacrylic acid ester include: α,β-unsaturated acids, such as acrylic acid and methacrylic acid; divalent carboxylic acids containing an unsaturated group, and alkyl esters thereof, such as maleic acid, fumaric acid, itaconic acid, and cinnamic acid; styrene monomers, such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropenylbenzene (α-methylstyrene); aromatic vinyl compounds, such as 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide compounds, such as acrylonitrile and methacrylonitrile; unsaturated carboxylic acids, such as maleic anhydride and itaconic anhydride; maleimides and N-substituted maleimides and the like, such as N-methylmaleimide, N-ethylmaleimide, N-phenylmaleimide, and N-cyclohexylmaleimide; amides, such as acrylamide and methacrylamide; compounds formed by esterification of both end hydroxyl groups of an ethylene glycol, such as ethylene glycol di(meth)acrylate, diethylene glycol di(meth)acrylate, triethylene glycol di(meth)acrylate, tetraethylene glycol di(meth)acrylate, or an oligomer thereof, with acrylic acid or methacrylic acid; compounds formed by esterification of two alcohol hydroxyl groups of neopentylglycol di(meth)acrylate and the like with acrylic acid or methacrylic acid; compounds formed by esterification of a polyhydric alcohol derivative such as trimethylolpropane and pentaerythritol with acrylic acid or methacrylic acid; polyfunctional monomers such as divinylbenzene.

Especially, in the methacrylic resin according to the present embodiment, from the perspective of increasing weatherability, heat resistance, fluidity, and thermal stability, methyl acrylate, ethyl acrylate, n-propyl acrylate, n-butyl acrylate, sec-butyl acrylate, 2-ethylhexyl acrylate and the like are preferred, and more preferred are methyl acrylate, ethyl acrylate, and n-butyl acrylate. From the perspective of availability, methyl acrylate is still more preferred.

One of the above-described vinyl monomer may be used alone, or two or more may be used together.

Further, the same vinyl monomer may be included in the below-described polymer (I) and polymer (II), or different vinyl monomers may be included.

The added amount of the other vinyl monomer which is copolymerizable with a methacrylic acid ester in the methacrylic resin according to the present embodiment can be appropriately selected within a range in which the properties of the obtained methacrylic resin are not harmed. Considering fluidity, weatherability, and thermal stability, the added amount is, based on the methacrylic resin, 0.5 to 20% by mass, preferably 0.5 to 15% by mass, more preferably 0.5 to 10% by mass, still more preferably 0.7 to 8% by mass, even more preferably 1 to 8% by mass and still even more preferably 1 to 6% by mass.

(Weight Average Molecular Weight, Number Average Molecular Weight Etc. of the Methacrylic Resin)

The weight average molecular weight, number average molecular weight, and peak molecular weight of the methacrylic resin according to the present embodiment are measured by gel permeation chromatography (GPC).

Specifically, a calibration curve is plotted from an elution time and the weight average molecular weight using a standard methacrylic resin that can be obtained in advance as a monodisperse reagent having a known weight average molecular weight, number average molecular weight, and peak molecular weight, and an analysis gel column that elutes a high molecular weight component first.

Next, based on the obtained calibration curve, the weight average molecular weight, number average molecular weight, and peak molecular weight of a sample of the methacrylic resin, which is the measurement target, can be determined.

The methacrylic resin according to the present embodiment has a weight average molecular weight measured by gel permeation chromatography (GPC) of 60,000 to 300,000. Methacrylic resins in this range have excellent mechanical strength, solvent resistance, and fluidity. More preferred is 60,000 to 250,000, and still more preferred is 70,000 to 230,000.

Considering the balance among fluidity, mechanical strength, and solvent resistance, the molecular weight distribution (weight average molecular weight/number average molecular weight: Mw/Mn) is preferably 2.1 or more and 7 or less. More preferred is 2.1 or more and 6 or less, still more preferred is 2.2 or more and 5 or less, and even more preferred is 2.2 or more and 4.5 or less.

(Methacrylic Resin Peak Molecular Weight)

To improve the processing fluidity during molding of the methacrylic resin according to the present embodiment, and to obtain a good plasticizing effect, the content of the molecular weight component that is 1/5 or less the peak molecular weight (Mp) present in the methacrylic resin is preferably 7 to 40%. More preferred is 7 to 35%, still more preferred is 8 to 35%, and even more preferred is 8 to 30%.

The content of the molecular weight component that is 1/5 or less the peak molecular weight (Mp) can be determined based on the ratio of the region area obtained from a GPC elution curve.

It is preferred that the content of the methacrylic resin component having a molecular weight of 500 or less is small, because such a methacrylic resin component tends to produce bubble-like appearance defects known as "silver streaks" during molding.

Here, the peak molecular weight (Mp) refers to the molecular weight indicating a peak in the GPC calibration curve.

If there are a plurality of peaks in the GPC calibration curve, the peak molecular weight is the peak indicating the greatest content.

A specific method for determining the peak molecular weight (Mp) of the GPC calibration curve will now be described.

Figure 2:
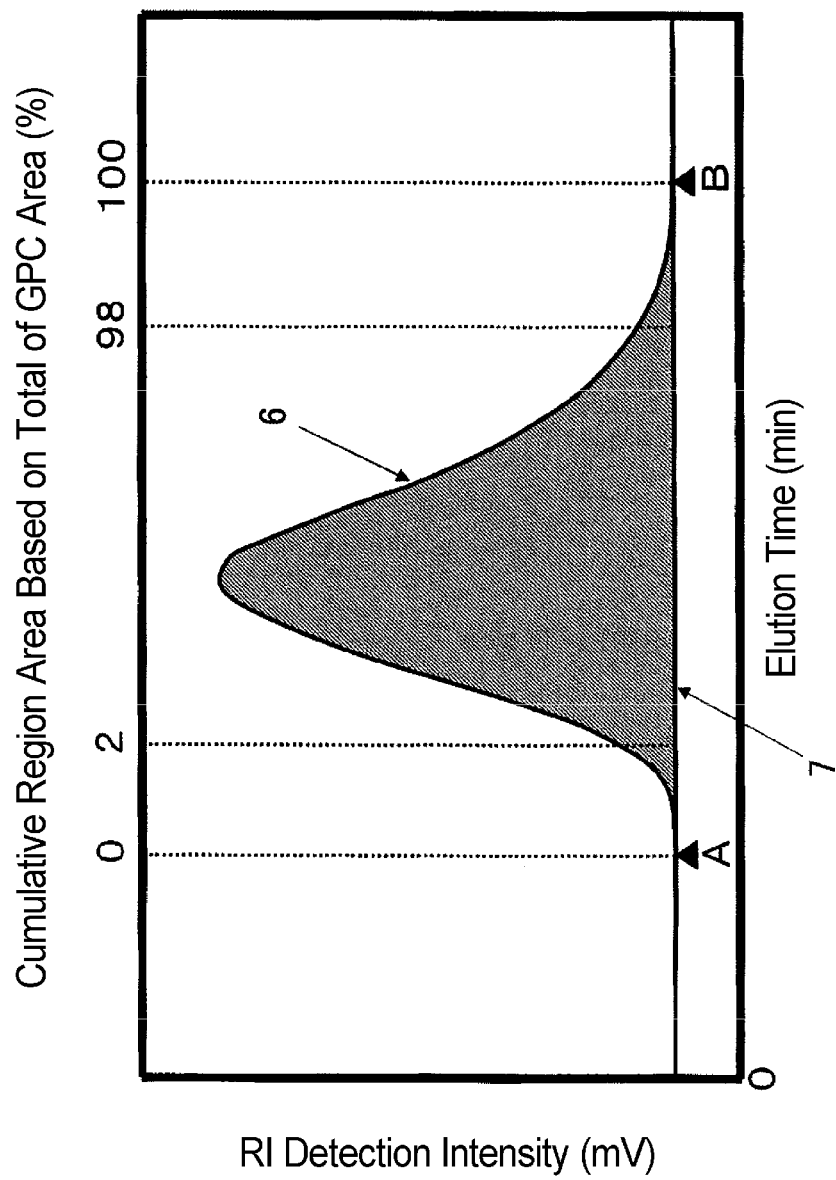
FIG. 2 shows a diagram illustrating an example of a cumulative region area on a GPC elution curve measurement graph of a methacrylic resin.

FIG. 2 illustrates an example of a cumulative region area on a GPC calibration curve measurement graph of a methacrylic resin. The vertical axis of the graph represents the RI (differential refraction) detection intensity (mV), the lower part of the horizontal axis of the graph represents the elution time (minutes), and the upper part represents the cumulative region area (%) based on the total GPC region area.

First, in FIG. 2, a point A and a point B, where a baseline automatically drawn by the measurement device intersects with the GPC elution curve, are determined for a GPC elution curve obtained from the elution time obtained by GPC measurement and the detection intensity from the RI (differential refraction detector).

Point A is the point where the GPC elution curve at the start of elution intersects the baseline.

Point B is, in principle, a position where the baseline and the GPC elution curve intersect at a molecular weight of 500 or more. If there is no intersection for the range in which the molecular weight is 500 or more, point B is set as the value of the RI detection intensity at the elution time when the molecular weight is 500.

The shaded portion enclosed by the GPC elution curve between points A and B and the line segment AB is the region of the GPC elution curve. This area is the region area of the GPC elution curve.

The GPC elution curve shown in FIG. 2 was plotted using a column in which elution proceeded from the high molecular weight component. Further, the high molecular weight component is observed at the start of elution, and the low molecular weight component is observed at the end of elution.

In FIG. 2, the value obtained by converting the elution time at the position corresponding to the peak top of the GPC elution curve measurement graph into a molecular weight is the peak molecular weight (Mp).

Figure 3:
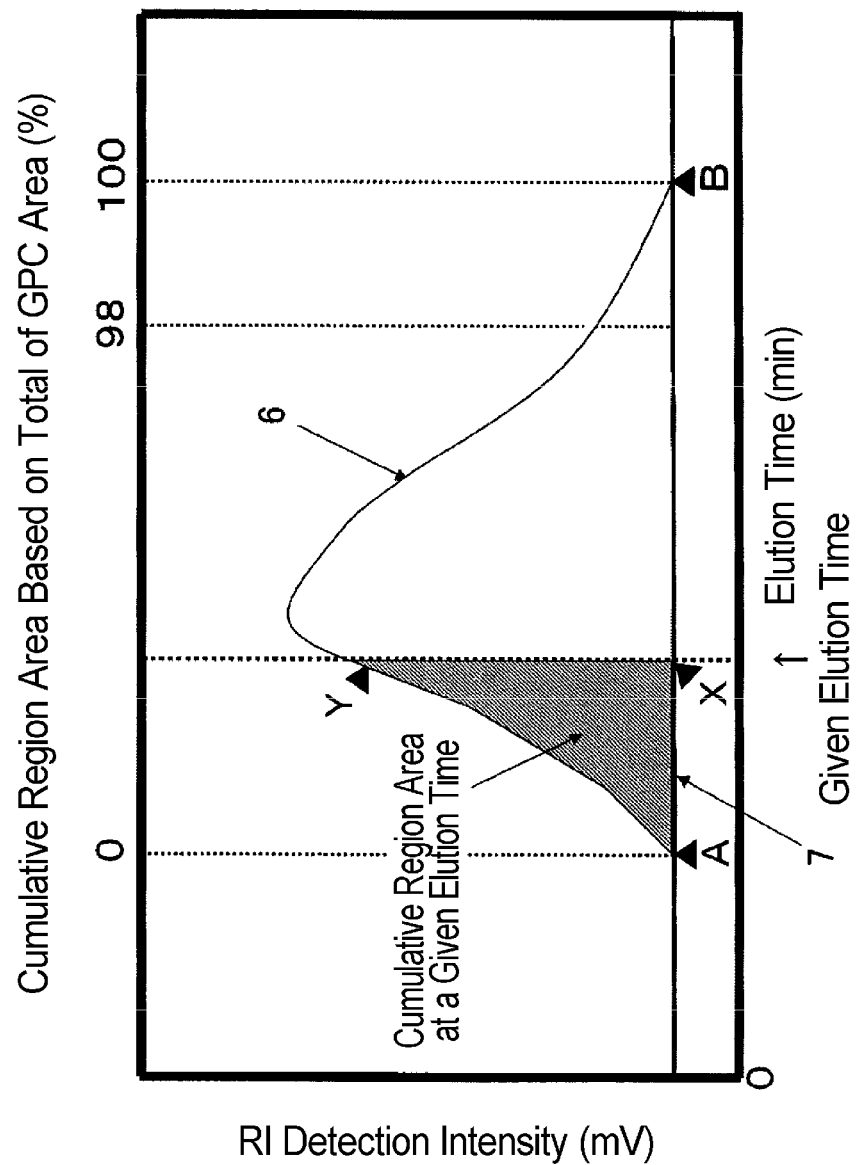
FIG. 3 shows a diagram illustrating a specific cumulative region area on a GPC elution curve measurement graph.

FIG. 3 illustrates a specific example of the cumulative region area (%) under the GPC elution curve.

The cumulative region area (%) of the region area of the GPC elution curve is considered to be formed by adding up the detection intensities corresponding to the respective elution times heading toward the finish of the elution time, in which point A in FIG. 3 is a cumulative region area (%) reference of 0%.

In FIG. 3, point X is a point on the baseline and point Y is a point on the GPC elution curve at a given elution time. The ratio of the area enclosed by the curve AY, line segment AX, and line segment XY to the region area of the GPC elution curve is taken as the value of the cumulative region area (%) at a given elution time.

Figure 4:
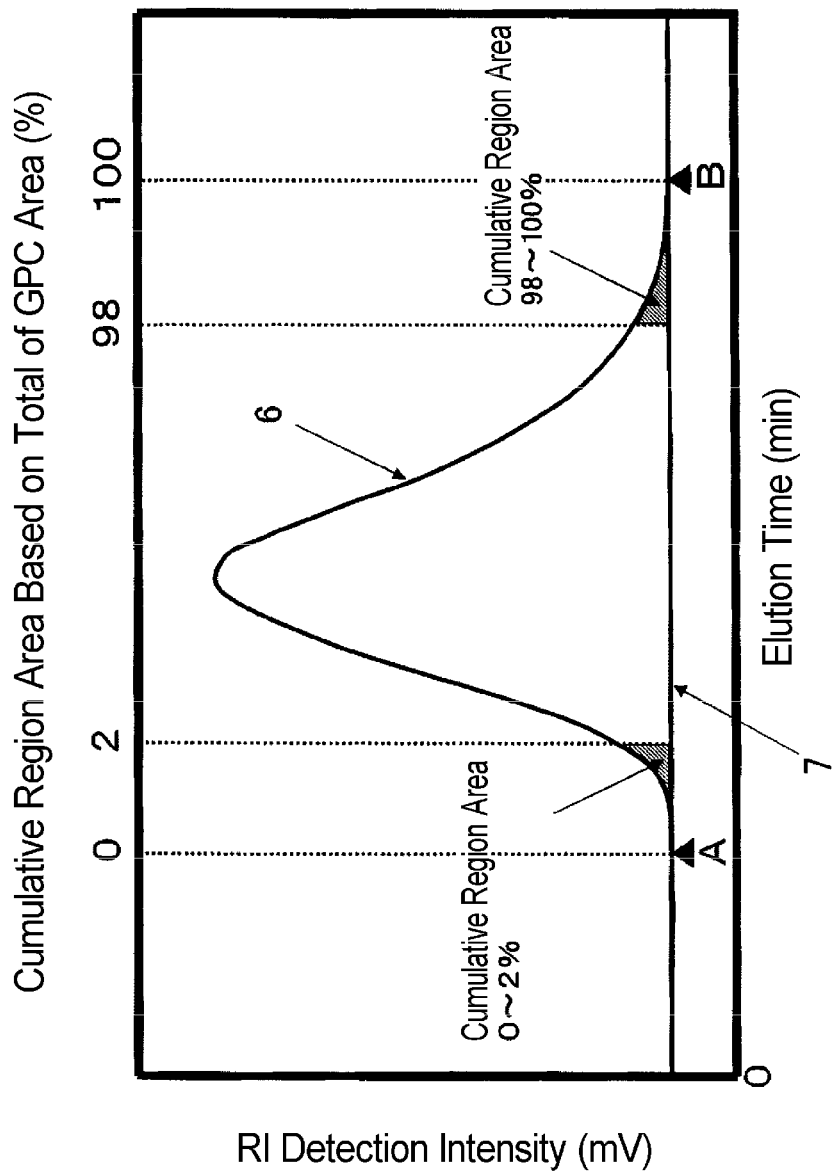
FIG. 4 shows a schematic diagram illustrating the positions of a cumulative region area of 0 to 2% and a cumulative region area of 98 to 100% on a GPC elution curve measurement graph.

The average composition ratio of the other vinyl monomer unit which is copolymerizable with a methacrylic acid ester in the methacrylic resin having a molecular weight component for which the cumulative region area of the GPC elution curve of the methacrylic resin according to the present invention is 0 to 2% will be referred to as Mh (% by mass). On the other hand, the average composition ratio of the other vinyl monomer unit which is copolymerizable with a methacrylic acid ester in the methacrylic resin having a cumulative region area of 98 to 100%, i.e., the low molecular weight, will be referred to as Ml (% by mass). FIG. 4 illustrates a schematic diagram of the positions in the measurement graph of the 0 to 2% and the 98 to 100% cumulative region areas.

The Mh and Ml values can be determined by consecutively sampling several times or several dozen times the elution time obtained from GPC based on the size of the column.

The sampling number may be selected based on the level of the gas chromatography that can be applied. Generally, if the column is large, the amount that is collected in one go decreases. The composition of the obtained samples may be analyzed by a known pyrolysis gas chromatography method.

In the methacrylic resin according to the present embodiment, it is preferred that the average composition ratio Mh (% by mass) of the other vinyl monomer unit which is copolymerizable with a methacrylic acid ester in the methacrylic resin having a molecular weight component for which the cumulative region area of the GPC elution curve is 0 to 2% and the average composition ratio (Ml) (% by mass) of the other vinyl monomer unit which is copolymerizable with a methacrylic acid ester in the methacrylic resin having a cumulative region area of 98 to 100%, i.e., low molecular weight, satisfy the relationship of the following expression (1):

$$(Mh-0.8) \geq Ml \geq 0 \tag{1}$$

The above expression (1) illustrates that the high molecular weight component has a higher average composition of the other vinyl monomer which is copolymerizable with a methacrylic acid ester than the low molecular weight component by at least is 0.8% by mass, and that the other vinyl monomer does not have to be copolymerized with the low molecular weight component.

To improve fluidity, it is preferred that the difference between Mh (% by mass) and Ml (% by mass) is 0.8% by mass or more. More preferred is 1.0% by mass or more, and still more preferred is if the following expression (2) holds true:

$$(Mh-2) \geq Ml \geq 0 \tag{2}$$

Specifically, it is preferred to set the average composition of the other vinyl monomer unit which is copolymerizable with a methacrylic acid ester of the methacrylic resin in the high molecular weight component 2% by mass or more greater than the average composition of the low molecular weight component, because a dramatic improvement in fluidity can be obtained while maintaining heat resistance, a low incidence of cracks and molded article distortion under environmental testing, and mechanical strength.

(Content of Component Having Molecular Weight of 10,000 or Less in Methacrylic Resin)

From the perspectives of improving processing fluidity and reducing appearance defects in a molded article known as silver streaks during molding, for example, it is preferred that the content of the component having a molecular weight of 10,000 or less in the methacrylic resin according to the present embodiment is 1% or more and 10% or less based on the region area ratio obtained from the GPC elution curve.

By setting this content to 1% or more, the processing fluidity can be improved, and by setting this content to 10% or less, appearance defects such as silver streaks during molding can be reduced.

For example, in FIG. 3, when point X is on the baseline at the elution time where the molecular weight is 10,000, and point Y is on that GPC elution curve, the content of the component having a molecular weight of 10,000 or less can be obtained by determining the ratio of the area enclosed by the curve BY, line segment BX, and line segment XY with respect to the region area of the GPC elution curve.

(Angle of Repose of the Methacrylic Resin)

The methacrylic resin according to the present embodiment preferably has an angle of repose of 20 to 40°. If the angle of repose is in this range, during extrusion processing and molding, it is easier for the screw to bite into the methacrylic resin, and the methacrylic resin becomes very easy to handle. If the angle of repose is less than 20°, friction among the particles is too small, so that ease with which the resin is bitten into by the screw tends to deteriorate, which can cause plasticization stability to deteriorate. If this value exceeds 40°, problems such as pipe blockages in the production equipment and measurement precision defects tend to occur, and handling deteriorates. The angle of repose is more preferably 35° or less, still more preferably 33° or less, and even more preferably 30° or less.

(Methacrylic Resin Yellowness Index Difference)

The yellowness index (ΔYI) difference of the methacrylic resin according to the present embodiment can be obtained using the following equation, using 4 test pieces 3 mm thick, 20 mm wide, and 220 mm long laminated over each other, by measuring YI (yellowness index) in the 220 mm length direction based on JIS T7105 (plastic optical characteristics test method) using the colorimeter TC-8600A manufactured by Nippon Denshoku Industries Co., Ltd.

ΔYI represents the degree of yellowing in a molded article. A smaller value indicates less yellowing.

$$\text{Yellowness index difference } \Delta YI = YI - YIO$$

ΔYI=Yellowness index difference
YI=Molded article yellowness index
YIO=Air yellowness index The methacrylic resin according to the present embodiment preferably has a yellowness index difference as measured under the above-described conditions of 30 or less, more preferably 25 or less, still more preferably 22 or less, and even more preferably 20 or less.

(Methacrylic Resin Average Particle Size)

From the perspective of handleability, the methacrylic resin according to the present embodiment preferably has an average particle size of 0.1 mm to 10.0 mm. More preferred is 0.1 to 3.0 mm, still more preferred is 0.1 to 1.0 mm, even more preferred is 0.15 to 0.80 mm, still even more preferred is 0.16 to 0.70 mm, and especially preferred is 0.2 to 0.7 mm.

The average particle size can be obtained by, for example, classifying the particles using a sieve based on JIS-Z8801, measuring the weight distribution thereof, creating a particle distribution based on the weight distribution, and calculating the particle size corresponding to 50% by mass from this particle size distribution as the average particle size.

The shape of the particles is preferably, for example, a cylindrical, roughly spherical, or tablet shape. From the perspective of handleability and uniformity, a roughly spherical shape is preferred.

If the methacrylic resin includes a large amount of fine particles having a particle size of less than 0.15 mm, handleability deteriorates due to a tendency for the fine particles to float around during handling. Therefore, if handleability needs to be especially good, it is preferred to reduce this content by a certain extent.

However, it is not desirable to remove all of the fine particles of less than 0.15 mm, because the number of processing steps, such as sieving and removing, increases. Therefore, a certain amount is permitted.

From the above perspectives, it is preferred that the content of the components having a particle size less than 0.15 mm is 0.01% by mass or more and 10% by mass or less. More preferred is 0.1% by mass or more and 10% by mass or less, still more preferred is 0.1% by mass or more and 8% by mass or less, even more preferred is 0.2% by mass or more and 7% by mass or less, and still even more preferred is 0.3% by mass or more and 6% by mass or less.

The content of the components having a particle size of less than 0.15 mm can be determined by, for example, dividing the amount remaining on the pan by the amount originally placed on the sieve when sieving for 10 minutes at maximum vibration output using a sieve based on JIS-Z8801, a JTS-200-45-33 (500 μm apertures), 34 (425 μm apertures), 35 (355 μm apertures), 36 (300 μm apertures), 37 (250 μm apertures), 38 (150 μm apertures), and 61 (pan), and also the test sieve shaker TSK-B-1, manufactured by Tokyo Screen.

Examples of a method for reducing particles having a particle size of less than 0.15 mm include sieving the obtained methacrylic resin with a sieve having apertures of 0.15 mm or more and using the resin remaining on the sieve, and reducing the amount of particles less than 0.15 mm by using a centrifugal separator equipped with a mesh having apertures of 0.15 mm or more.

By using the polymerization method according to the present invention, the content of particles having a particle size of less than 0.15 mm can be reduced without performing the above-described operations.

[Methacrylic Resin Production Method]

Methods for producing the above-described methacrylic resin according to the present embodiment will now be described. However, the method for producing the methacrylic resin according to the present embodiment is not limited to the following methods.

The methacrylic resin according to the present embodiment can be produced by bulk polymerization, solution polymerization, suspension polymerization, and emulsion polymerization. It is preferred to use bulk polymerization, solution polymerization, or suspension polymerization, more preferred to use solution polymerization or suspension polymerization, and still more preferred to use suspension polymerization.

Specific examples of the method for producing the methacrylic resin according to the present embodiment include the following.

(First Method)

A predetermined amount of a polymer (I) having a predetermined weight average molecular weight (e.g., 5,000 to 50,000) is produced in advance. A predetermined amount of this polymer (I) is mixed with a raw material composition mixture of a polymer (II) having a weight average molecular weight different from polymer (I) (e.g., 60,000 to 350,000), and the resultant mixed solution is polymerized.

(Second Method)

A polymer (I) having a predetermined weight average molecular weight (e.g., 5,000 to 50,000) is produced in advance. Then, a raw material composition mixture of a polymer (II) having a weight average molecular weight different from polymer (I) (e.g., 60,000 to 350,000) is successively charged into the polymer (I), or the polymer (I) is successively charged into a raw material composition mixture of the polymer (II), and the resultant mixture is polymerized.

The weight average molecular weight of polymer (I) is, from the perspectives of suppressing defects such as silver streaks during molding, polymerization stability, and conferring fluidity, preferably 5,000 to 50,000 as measured by gel permeation chromatography. More preferred is 10,000 to 50,000, still more preferred is 20,000 to 50,000, and even more preferred is 20,000 to 35,000.

If particular consideration needs to be given to polymerization stability, it is preferred that the blended amount of the methacrylic acid ester monomer in the copolymerizable other vinyl monomer is essentially zero. An amount included as impurities in the raw material methacrylic acid ester monomer is permitted.

The weight average molecular weight of polymer (II) is, from the perspectives of mechanical strength and fluidity, preferably 60,000 to 350,000. More preferred is 70,000 to 320,000, and still more preferred is 75,000 to 300,000.

In the polymerization step of producing the methacrylic resin according to the present embodiment, a polymerization initiator may be used to adjust the degree of polymerization of the produced polymer.

When carrying out radical polymerization, examples of the polymerization initiator include typical radical polymerization initiators, for instance organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, 1,1-bis(t-butylperoxy)cyclohexane, and azo polymerization initiators such as azobisisobutyronitrile, azobisisovaleronitrile, 1,1-azobis(1-cyclohexanecarbonitrile), 2,2'-azobis-4-methoxy-2,4-azobisisobutyronitrile, 2,2'-azobis-2,4-dimethylvaleronitrile, and 2,2'-azobis-2-methylbutyronitrile.

These may be used singly, or two or more may be used together.

These radical polymerization initiators may be combined with a suitable reducing agent, and used as a redox initiator.

These polymerization initiators are typically used in a range of 0 to 1 part by mass based on a total of 100 parts by mass of all the used monomers. These polymerization initiators may be appropriately selected considering the temperature at which the polymerization is to be carried out, and the half-life of the initiator.

When selecting a bulk polymerization method, a cast polymerization method, or a suspension polymerization method, from the perspective that resin coloration can be prevented, it is especially preferred to use a peroxide initiator, such as lauroyl peroxide, decanoyl peroxide, and t-butylperoxide-2-ethylhexanoate, and it is more especially preferred to use lauroyl peroxide.

Further, when performing solution polymerization at a high temperature of 90° C. or more, a peroxide or azobis initiator, for example, which have a 10 hour half-life temperature of 80° C. or more and are soluble in the used organic solvent, is preferred. Specific examples thereof include 1,1-bis(t-butylperoxy)-3,3,5-trimethylcyclohexane, cyclohexane peroxide, 2,5-dimethyl-2,5-di(benzoylperoxy)hexane, 1,1-azobis(1-cyclohexanecarbonitrile), and 2-(carbamoylazo)isobutyronitrile. It is preferred to use these polymerization initiators in a range of, for example, 0 to 1 part by mass based on a total of 100 parts by mass of all the used monomers.

In the production step of the methacrylic resin according to the present embodiment, to the extent that the objective of the present invention is not harmed, the molecular weight of the produced polymer can be controlled.

For example, the molecular weight can be controlled by using a chain transfer agent, such as an alkyl mercaptan, dimethylacetamide, dimethylformamide, and triethylamine, and an iniferter, such as dithiocarbamate, triphenylmethylazobenzene, and a tetraphenylethane derivative.

By adjusting the added amount of these, the molecular weight can be adjusted. If these additives are used, from the perspectives of handleability and stability, it is preferred to use an alkyl mercaptan. Examples thereof include n-butyl mercaptan, n-octyl mercaptan, n-dodecyl mercaptan, t-dodecyl mercaptan, n-tetradecyl mercaptan, n-octadecyl mercaptan, 2-ethylhexylthioglycolate, ethylene glycol dithioglycolate, trimethylolpropane tris(thioglycolate), pentaerythritol tetrakis(thioglycolate) and the like.

Although these may be appropriately added based on the required molecular weight, typically they are used in a range of 0.001 to 3 parts by mass based on a total of 100 parts by mass of all the used monomers.

Further, examples of other methods for controlling molecular weight include a method in which the polymerization method is changed, a method in which the amount of the polymerization initiator is adjusted, a method in which the polymerization temperature is changed and the like.

One of these molecular weight control methods may be used alone, or two or more may be used together.

Although the optimum polymerization temperature may be appropriately selected based on the polymerization method, the polymerization temperature is preferably 50° C. or more and 200° C. or less.

The above-described (First Method) and (Second Method) are methods for producing a methacrylic resin in which two components having a different weight average molecular weight are the constituent elements. However, the method for producing a methacrylic resin according to the present embodiment may also produce a polymer (III) and a polymer (IV), for example, having a different molecular weight composition based on the same procedures.

In a state in which polymer (I) has been produced, and that polymer (I) is present in the raw material composition mixture of polymer (II), the method for producing the polymer (II) is a preferred method as the method for producing the methacrylic resin according to the present embodiment.

This method is preferred because it is easy to control the respective compositions of polymers (I) and (II), an increase in the temperature caused by the heat generated during polymerization can be controlled, and the viscosity in the system can also be stabilized.

In this case, the raw material composition mixture of polymer (II) may also be in a state in which a part has already started polymerization. Consequently, as the polymerization method, any of bulk polymerization, solution polymerization, suspension polymerization, or emulsion polymerization is preferred, and more preferred is any of bulk polymerization, solution polymerization, or suspension polymerization.

<Blending Ratio of Polymers (I) and (II)>

Next, the specific blending ratio of the above-described polymers (I) and (II) in the method for producing the methacrylic resin according to the present embodiment will be described.

In the following description, polymers (I) and (II) both have, as the polymer raw material, a methacrylic acid ester-based polymer that includes a methacrylic acid ester monomer.

In the above-described (First Method) and (Second Method), in both cases, in a first polymerization step a methacrylic acid ester-based polymer (polymer (I)) is obtained by polymerizing a methacrylic acid ester monomer, or a methacrylic acid ester monomer and other vinyl monomer which is copolymerizable with at least one methacrylic acid ester, and in a second polymerization step a methacrylic acid ester-based polymer (polymer (II)) is obtained that can be obtained by polymerizing a methacrylic acid ester monomer, or a methacrylic acid ester monomer and other vinyl monomer which is copolymerizable with at least one methacrylic acid ester.

The blending ratio of these is preferably 5 to 45% by mass of polymer (I) and 95 to 55% by mass of polymer (II).

Setting such a blending ratio enables polymerization stability to be achieved in the production step, and is also preferred from the perspectives of the fluidity, molding properties, and mechanical strength of the methacrylic resin. To obtain an even better balance among these properties, the polymer (I)/polymer (II) ratio is more preferably 5 to 40% by mass/95 to 60% by mass, still more preferably 5 to 35% by mass/95 to 65% by mass, and even more preferably 10 to 35% by mass/90 to 65% by mass.

When adding as the polymer (I) raw material other vinyl monomer to the methacrylic acid ester monomer, from the perspective of the color hue of the obtained polymer, it is preferred that the composition ratio between the methacrylic acid ester monomer and the other vinyl monomer is, based on 80 to 100% by mass of the methacrylic acid ester monomer, 20 to 0% by mass of the other vinyl monomer. More preferably, methacrylic acid ester monomer/other vinyl monomer is 90 to 100% by mass/10 to 0 mass %, and still more preferred is 95 to 100 mass %/5 to 0% by mass.

If particular consideration needs to be given to polymerization stability, it is preferred that the blended amount of the copolymerizable other vinyl monomer in polymer (I) is essentially zero. In such case, an amount included as impurities in the raw material methacrylic acid ester monomer is permitted.

When adding other vinyl monomer to the methacrylic acid ester monomer serving as the polymer (II) raw material, from the perspective of the thermal stability of the obtained polymer, it is preferred that the composition ratio between the methacrylic acid ester monomer and the other vinyl monomer is, based on a composition ratio of methacrylic acid ester monomer/other vinyl monomer, 80 to 99.5% by mass/20 to 0.5% by mass, more preferred is 85 to 99.5% by mass/15 to 0.5% by mass, still more preferred is 88 to 99% by mass/12 to 1% by mass, and even more preferred is 90 to 98.5% by mass/10 to 1.5% by mass.

<Vinyl Monomer Copolymerization Ratio in Polymer (I) and in Polymer (II)>

When Mal (% by mass) is the composition ratio of the other vinyl monomer unit which is copolymerizable with a methacrylic acid ester in polymer (I), and Mah (% by mass) is the composition ratio of the other vinyl monomer unit which is copolymerizable with a methacrylic acid ester in polymer (II), it is preferred from the perspective of polymerization stability that the copolymerization ratio in polymer (I) and polymer (II), respectively, of the other vinyl monomer unit which is copolymerizable with a methacrylic acid ester used as a polymerization raw material of the above-described polymer (I) and polymer (II) satisfies the relationship of the following expression (3):

$$Mah \geq Mal \geq 0 \quad (3)$$

It is preferred that the high molecular weight polymer (II) includes a large amount of the other vinyl monomer which is copolymerizable with a methacrylic acid ester based on the composition ratio, as this enables polymerization stability to be achieved, and also allows fluidity to be improved while maintaining heat resistance and mechanical strength.

It is more preferred that the relationship of the following expression (4) is satisfied:

$$(Mah-0.8) \geq Mal \geq 0 \quad (4)$$

When the methacrylic resin obtained by the production method according to the present embodiment is formed into a molded article, if there is a need for improved fluidity while maintaining a low incidence of cracks and molded article distortion under environmental testing and mechanical strength, it is preferred that the relationship of the following expression (5) is satisfied.

$$(Mah-2) \geq Mal \geq 0 \quad (5)$$

The level of the composition ratio Mal of the other vinyl monomer unit which is copolymerizable with a methacrylic acid ester in polymer (I) and the level of the composition ratio Mah of the other vinyl monomer unit which is copolymerizable with a methacrylic acid ester in polymer (II) can each be determined by measuring by pyrolysis gas chromatography.

To adjust the composition ratios Mal and Mah so that the above-described expressions are satisfied, the amount of other vinyl monomer which is copolymerizable with a methacrylic acid ester monomer to be added during the first stage and second and subsequent polymerization stages may be adjusted.

(Method for Producing Methacrylic Resin by Suspension Polymerization)

A case will now be especially described in more detail in which, in the method for producing the methacrylic resin according to the present embodiment, the polymerization step is carried out using suspension polymerization.

When producing the methacrylic resin by suspension polymerization, in the above-described (First Method) and (Second Method), the polymerization of polymer (II) is carried out in the presence of polymer (I).

<Stirring Apparatus>

As the stirring device used in the polymerization apparatus for obtaining the methacrylic resin by suspension polymerization, the known stirring devices can be used, such as a stirring device having in its interior a stirring impeller, such as an inclined paddle impeller, a flat paddle impeller, a propeller impeller, an anchor impeller, a Pfaudler impeller, a turbine impeller, a bull margin impeller, a maxblend impeller, a full zone impeller, a ribbon impeller, a supermix impeller, an Intermig impeller, a special impeller, and an axial-flow impeller, a stirring device having a shovel impeller in its interior, a stirring device having a chopper impeller in its interior, and a stirring device having a rotating disc in its interior, such as a disc type, a notched disc type, or a screw type.

Although the stirring rate during polymerization also depends on factors such as the type of stirring device to be used, the stirring efficiency of the stirring impeller, and the capacity of the polymerization tank, it is preferred that the stirring rate is about 1 to 500 rpm, in consideration of the fact that a suitable particle size can be obtained and the fact that the content of the component having a particle size less than 0.15 mm can be reduced, and in view of polymerization stability and the like.

<Polymerization Temperature and Polymerization Time>

The polymerization temperature in the suspension polymerization is, considering productivity and the production amount of the agglomerate, preferably 60° C. or more and 90° C. or less. More preferred is 65° C. or more and 85° C. or less, still more preferred is 70° C. or more and 85° C. or less, and even more preferred is 70° C. or more and 83° C. or less. The polymerization temperature of polymer (I) and polymer (II) may be the same or different.

The time (T1: herein, sometimes referred to as "polymerization time") from adding the raw material mixture of polymer (I) to reaching the exothermic peak temperature from the heat generated by polymerization is, from the perspective of reducing the occurrence of agglomerates, preferably 20 minutes or more and 240 minutes or less, more preferably 30 minutes or more and 210 minutes or less, still more preferably 45 minutes or more and 180 minutes or less, even more preferably 60 minutes or more and 150 minutes or less, and still even more preferably 60 minutes or more and 120 minutes or less.

This polymerization time (T1) may be adjusted as appropriate based on the amount of the used polymerization initiator and changes in the polymerization temperature.

The temperature when adding the raw material mixture of polymer (I) may be set considering the boiling point of the used raw materials. It is preferred that this temperature is about the same as, or equal to or lower than, the boiling point of the used raw materials.

If the temperature is high, the raw materials tend to volatilize during addition, so that the composition of the obtained polymer changes. If the temperature is low, it takes time to increase the temperature after addition of the raw materials. Therefore, it is preferred to add the raw materials at a certain temperature. Specifically, the temperature is preferably 60° C. or more and 90° C. or less, more preferably 60° C. or more and 85° C. or less, still more preferably 65° C. or more and 85° C. or less, even more preferably 65° C. or more and 80° C. or less, and still even more preferably 70° C. or more and 80° C. or less.

The raw material mixture of polymer (II) may be added immediately after the exothermic peak due to the polymerization of polymer (I) is observed, or may be added after holding for a predetermined period. When it is necessary to increase the degree of polymerization of the raw material mixture of polymer (I), it is preferred to add the raw material mixture of polymer (II) after holding for a predetermined period after the exothermic peak due to the polymerization of polymer (I) is observed.

It is preferred that the holding period is 180 minutes or less. More preferred is 10 minutes or more and 180 minutes or less, still more preferred is 15 minutes or more and 150 minutes or less, even more preferred is 20 minutes or more and 120 minutes or less, and still even more preferred is 20 minutes or more and 90 minutes or less.

It is preferred that the temperature during this holding period is the same as or higher than the polymerization temperature of polymer (I), as this enables the degree of polymerization to be increased. If holding at a higher temperature, it is preferred to hold at a temperature 5° C. or more higher than the polymerization temperature. If increasing the temperature, from the perspective of preventing agglomeration of the obtained polymer, the temperature is preferably 100° C. or less. More specifically, 80° C. or more and 100° C. or less is preferred, 80° C. or more and 99° C. or less is more preferred, 85° C. or more and 99° C. or less is still more preferred, 88° C. or more and 99° C. or less is even more preferred, and 90° C. or more and 99° C. or less is still even more preferred.

By carrying out polymerization based on the above-described polymerization temperature and holding time, polymer particles having a smaller angle of repose can be produced.

When increasing the temperature in the above-described holding step, from the perspective of preventing volatilization of the raw material mixture of polymer (II), it is preferred to lower the temperature to about 70 to 85° C., and then add the raw material mixture of polymer (II).

The time (T2: herein, sometimes referred to as "polymerization time") from adding the raw material mixture of polymer (II) until the exothermic peak temperature from the heat generated by polymerization is observed is, from the perspectives of reducing the angle of repose of the obtained polymer and reducing the amount of agglomerates, preferably 30 minutes or more and 240 minutes or less, more preferably 45 minutes or more and 210 minutes or less, still more preferably 60 minutes or more and 210 minutes or less, even more preferably 60 minutes or more and 180 minutes or less, and still even more preferably 80 minutes or more and 150 minutes or less.

As the relationship between the polymerization times of polymer (I) and polymer (II), from a productivity perspective and the perspective that a resin having a small angle of repose can be obtained, the relationship between the polymerization time of polymer (I), i.e., the time (T1) until reaching the exothermic peak temperature from the heat generated by polymerization after adding the monomer in the first stage polymerization, and the polymerization time of polymer (II), i.e., the time (T2) until reaching the exothermic peak temperature from the heat generated by polymerization after adding the monomer in the second stage polymerization, preferably satisfies the following relational expression (6):

$$0.6 < T2/T1 \leq 5 \qquad (6)$$

When particularly considering the color hue of the obtained resin, it is preferred that $0.6 < T2/T1 \leq 4$, more preferred that $0.8 \leq T2/T1 \leq 4$, and still more preferred that $0.8 \leq T2/T1 \leq 3$.

Especially from the perspectives of reducing the angle of repose, as well as suppressing generation of agglomerates, which are a cause of deterioration in yield, it is preferred that $1 \leq T2/T1 \leq 5$, more preferred that $1 \leq T2/T1 \leq 4$, and still more preferred that $1 \leq T2/T1 \leq 3$.

On the other hand, to especially reduce the residual monomer amount and the agglomerate content in a well-balanced manner, it is preferred to select a range of $0.6 < T2/T1 < 1$, more preferred is $0.65 < T2/T1 < 1$, still more preferred is $0.7 < T2/T1 < 1$, even more preferred is $0.75 < T2/T1 < 1$, and still even more preferred is $0.8 \leq T2/T1 < 0.95$, To obtain good color hue properties, reduce the angle of repose, and reduce agglomerates, it is preferred to set so that 0.6<T2/T1≤4. However, it is more preferred to select the above-described polymerization times based on a desired property among the above-described properties.

To adjust so that the time until reaching the exothermic peak temperature following the first and second stages satisfies the above-described relational expression (6), the polymerization ratio of polymer (I) and polymer (II) can be adjusted, the polymerization temperature can be adjusted, or the amount of used polymerization initiator can be adjusted as appropriate.

Following observation of the exothermic peak temperature from the heat generated by polymerization after adding the raw material mixture of polymer (II), it is preferred to increase the temperature by 5° C. or more above the polymerization temperature of polymer (II), as this enables the amount of residual monomer in the obtained methacrylic resin to be suppressed. More preferred is 7° C. or more, and still more preferred is 10° C. or more.

Further, to prevent agglomeration of the obtained resin, it is preferred that the increased end-point temperature is 100° C. or less. A more preferred range is 85° C. or more and 100° C. or less, still more preferred is 88° C. or more and 99° C. or less, and even more preferred is 90° C. or more and 99° C. or less.

The time for holding at the above-described increased temperature is, considering the effect of reducing residual monomers, preferably 15 minutes or more and 360 minutes or less, more preferably 30 minutes or more and 240 minutes or less, still more preferably 30 minutes or more and 180 minutes or less, even more preferably 30 minutes or more and 150 minutes or less, and still even more preferably 30 minutes or more and 120 minutes or less.

<Washing Method>

To remove the suspension agent, it is preferred to subject the slurry of the methacrylic resin obtained by the above-described polymerization step to an operation such as acid cleaning, water washing, and alkali cleaning. These cleaning operations may be carried out once or a plurality of times. The optimum number can be selected based on the operation efficiency and the removal efficiency of the suspension agent.

The optimum temperature for performing the cleaning may be selected in consideration of the removal efficiency of the suspension agent and the coloration degree of the obtained polymer. Preferably, this temperature is 20 to 100° C., more preferably 30 to 95° C., and still more preferably 40 to 95° C.

The cleaning time per one cleaning operation is, from the perspectives of cleaning efficiency, angle of repose reduction effect, and step simplicity, preferably 10 to 180 minutes, and more preferably 20 to 150 minutes.

The pH of the cleaning solution used during cleaning may be in the range within which the suspension agent can be removed, and is preferably a pH of 1 to 12. If performing acid cleaning, from the perspective of removal efficiency of the suspension agent and the color hue of the obtained polymer, the pH is preferably 1 to 5, and more preferably 1.2 to 4. Acids that can be used in this operation are not especially limited, as long as the suspension agent can be removed. Conventionally-known inorganic acids and organic acids may be used. Examples of inorganic acids that may be preferably used include hydrochloric acid, nitric acid, sulfuric acid, phosphoric acid, boric acid and the like. Dilute solutions of these acids with water may also be used. Examples of organic acids include acids having a carboxyl group, a sulfo group, a hydroxy group, a thiol group, an enol and the like. Considering the removal efficiency of the suspension agent and the color hue of the obtained resin, more preferred are sulfuric acid, nitric acid, and an organic acid having a carboxyl group.

After the acid cleaning, from the perspective of the color hue of the obtained polymer and reduction of the angle of repose, it is preferred to further carry out water washing or alkali cleaning.

The pH of the alkali solution when performing alkali cleaning is preferably 7.1 to 12, more preferably 7.5 to 11, and still more preferably 7.5 to 10.5.

The alkaline component used in alkaline cleaning is preferably a tetraalkylammonium hydroxide, an alkali metal hydroxide, an alkaline earth metal hydroxide and the like. More preferred are an alkali metal hydroxide and an alkaline earth metal hydroxide. Still more preferred are lithium hydroxide, sodium hydroxide, potassium hydroxide, rubidium hydroxide, cesium hydroxide, magnesium hydroxide, calcium hydroxide, and barium hydroxide. Even more preferred are lithium hydroxide, sodium hydroxide, potassium hydroxide, magnesium hydroxide, calcium hydroxide. Still even more preferred are sodium hydroxide and potassium hydroxide.

These alkaline components can be used by diluting with water to adjust the pH.

<Dewatering Step>

As a method for separating the polymer particles from the obtained polymer slurry, a conventionally-known method can be applied.

Examples thereof may include a dewatering method that uses a centrifugal separator which utilizes centrifugal force to shake out water, and a method that separates the polymer particles by suction removal of water on a porous belt or a filtration membrane.

<Drying Step>

The polymer obtained after the above-described dewatering step, which still contains water, may be subjected to a drying treatment by a known method, and then recovered.

Examples of such a method may include hot-air drying in which drying is carried out by blowing hot air into a tank from a hot-air drier or a blow heater, vacuum drying in which drying is carried out by reducing the pressure in the system and increasing the temperature as necessary, barrel drying in which moisture is thrown off by rotating the obtained polymer in a vessel, and spin drying in which drying is carried out by utilizing centrifugal force. One of these methods may be used alone, or two or more may be combined.

The moisture content of the obtained methacrylic resin is, considering the handleability, color hue and the like of the obtained resin, preferably 0.01% by mass to 1% by mass, more preferably 0.05% by mass to 1% by mass, still more preferably 0.1% by mass to 1% by mass, and even more preferably 0.27% by mass to 1% by mass. The moisture content of the obtained resin can be measured using the Karl Fischer method.

<Agglomerates>

When producing the methacrylic resin using suspension polymerization, although the obtained methacrylic resin is usually roughly spherical, agglomerates can sometimes be formed.

The term "agglomerates" refers to residual matter remaining on the sieve when the obtained polymer is passed through a sieve having a mesh of 1.68 mm.

If agglomerates remain in the methacrylic resin, the color hue of the obtained methacrylic resin tends to deteriorate. It is preferred that the amount of agglomerates in the methacrylic resin is no more than 1.2% by mass, and more preferred is no more than 1.0% by mass.

The agglomerate content can be calculated by measuring the weight of matter remaining on a sieve having a mesh of 1.68 mm after drying in an 80° C. drying oven for 12 hours, and dividing the obtained weight by the total weight of the raw materials to obtain the agglomerate produced amount (% by mass).

[Methacrylic Resin Composition]

The methacrylic resin according to the present embodiment can be used as a composition that is combined with a below-described predetermined other resin and predetermined additives.

<Other Resin>

Resins that can be combined are not especially limited. It is preferred to combine a curable resin and a thermoplastic resin.

Examples of the thermoplastic resin include polyalkylene arylate resins, such as polypropylene resin, polyethylene resin, polystyrene resin, syndiotactic polystyrene resin, ABS resin, methacrylic resin, AS resin, BAAS resin, MBS resin, AAS resin, biodegradable resin, polycarbonate-ABS resin alloy, polybutylene terephthalate, polyethylene terephthalate, polypropylene terephthalate, polytrimethylene terephthalate, and polyethylene naphthalate; polyamide resins, polyphenylene ether resins, polyphenylene sulfido resins, phenolic resins and the like. AS resins and BAAS resins are especially preferred to improve fluidity. ABS resins and MBS resins are preferred to improve impact resistance. Further, polyether resins are preferred to improve chemical resistance. In addition, polyphenylene ether resins, polyphenylene sulfide resins, phenolic resins and the like can be expected to have an effect of improving flame retardance.

Examples of curable resins include unsaturated polyester resins, vinyl ester resins, diallyl phthalate resins, epoxy resins, cyanate resins, xylene resins, triazine resins, urea resins, melamine resins, benzoguanamine resins, urethane resins, oxetane resins, ketone resins, alkyd resins, furan resins, styrylpyridine resins, silicone resins, synthetic rubber and the like.

One of these resins may be used alone, or two or more of these resins may be used together.

<Additives>

Predetermined additives may also be added to the methacrylic resin according to the present embodiment to confer various properties, such as rigidity and dimensional stability.

Examples of such additives include plasticizers, such as a phthalate, a fatty acid ester, a trimellitic acid ester, a phosphate, and a polyester; a mold release agent, such as a higher fatty acid, a higher fatty acid ester, and a mono-, di- or triglyceride of a higher fatty acid; an antistatic agent, such as a polyether, a polyether ester, a polyether ester amide, an alkylsulfonic acid salt, and an alkylbenzene sulfonic acid salt; antioxidants, UV absorbers, stabilizers such as a thermal stabilizer and a light stabilizer; flame retardants, flame retardant aids, curing agents, curing accelerants, conductivity imparting agents, stress mitigators, crystallization promoters, hydrolysis inhibitors, lubricants, impacting agents, slidability improvers, compatibilizing agents, nucleating agents, strengthening agents, reinforcing agents, flow control agents, dyes, sensitizers, coloration pigments, rubbery polymers, thickeners, anti-settling agents, anti-sagging agents, fillers, antifoaming agents, coupling agents, rust inhibitors, antibacterial and antifungal agents, antifouling agents, conductive polymers and the like.

Examples of thermal stabilizers include antioxidants such as a hindered phenolic antioxidant and a phosphorus processing stabilizer, and a hindered phenolic antioxidant is preferred. Specific examples thereof include pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylene bis (oxyethylene)bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6(1H,3H,5H)-trione, 2,6-di-tert-butyl-4-(4,6-bis (octylthio)-1,3,5-triazine-2-ylamine)phenol and the like. Especially, pentaerythritol tetrakis[3-(3,5-di-tert-butyl-4-hydroxyphenyl)propionate] is preferred.

Examples of UV absorbers include benzotriazole compounds, benzotriazine compounds, benzoate compounds, benzophenone compounds, oxybenzophenone compounds, phenolic compounds, oxazole compounds, malonate compounds, cyanoacrylate compounds, lactone compounds, salicylate compounds, benzoxazinone compounds and the like. Preferred are benzotriazole compounds and benzotriazine compounds. One of these may be used alone, or two or more may be used together.

Further, when adding a UV absorber, from the perspective of molding processability, it is preferred that the vapor pressure at 20° C. is $1.0 \times 10^{-4}$ Pa or less, more preferred is $1.0 \times 10^{-6}$ Pa or less, and still more preferred is $1.0 \times 10^{-8}$ Pa or less.

The expression "excellent molding processability" refers to there being little adhesion of the UV absorber to the roll during film molding, for example. If the UV absorber adheres to the roll, for example, the UV absorber sticks to the surface of the molded article, the appearance and optical properties and deteriorate. Consequently, adhering to the roll is not desirable when using the molded article as an optical material.

The UV absorber preferably has a melting point (Tm) of 80° C. or more, more preferably 100° C. or more, still more preferably 130° C. or more, and even more preferably 160° C. or more.

The UV absorbed preferably has a weight loss ratio when the temperature is increased from 23° C. to 260° C. at a rate of 20° C./min of 50° C. or less, more preferably 30% or less, still more preferably 15% or less, even more preferably 10% or less, and still even more preferably 5% or less.

<Additive and Other Resin Kneading Method>

As the kneading method when processing the methacrylic resin and mixing the various additives and other resin, a kneading and production may be carried out using a kneading machine such as an extruder, a heated roll, a kneader, a roller mixer, and a Banbury mixer.

Among these, kneading with an extruder is preferred from a productivity perspective.

The kneading temperature may be set based on the polymer forming the methacrylic resin and the preferred processing temperature of the other resin to be mixed. As a guide, this temperature may be in the range of 140 to 300° C., and preferably in the range of 180 to 280° C.

[Molded Article]

The methacrylic resin according to the present embodiment can be formed into a molded article by molding just the inventive methacrylic resin or by molding a resin composition that includes the inventive methacrylic resin.

Examples of methods for producing the molded article include known molding methods, such as injection molding, sheet molding, blow molding, injection blow molding, inflation molding, T-die molding, press molding, extrusion molding, foam molding, and casting. A secondary processing molding method, such as compressed air molding and vacuum molding, may also be used.

Further, when using a resin composition that blends a curable resin in the methacrylic resin, the molded article can be obtained by mixing the components for producing the resin composition without a solvent or optionally by using a solvent that can uniformly mix the components, then removing the solvent to obtain a resin composition, casting the resin composition into a mold, curing, then cooling, and removing the resultant molded article from the mold.

Further, the resin composition may be cast into a mold, then cured with a hot press. As the solvent for dissolving the respective components, a solvent that can uniformly mix the respective materials, and that by using it does not harm the effects of the present invention, may be used.

Examples of such solvents include toluene, xylene, acetone, methyl ethyl ketone, methyl butyl ketone, diethyl ketone, cyclopentanone, cyclohexanone, dimethylformamide, methyl cellosolve, methanol, ethanol, n-propanol, isopropanol, n-butanol, n-pentanol, n-hexanol, cyclohexanol, n-hexane, n-pentane and the like.

Further, an example of another method is to knead and produce a resin composition using a kneading machine, such as a heated roll, a kneader, a Banbury mixer, and an extruder, cooling and pulverizing the resin composition, and then perform molding by transfer molding, injection molding, compression molding and the like. In addition, examples of the curing method include thermal curing, photocuring, UV curing, pressure curing, moisture curing and the like. The order for mixing the respective components is carried out using a method that can achieve the effects of the present invention.

[Applications]

The methacrylic resin according to the present embodiment, and the resin composition using this, can be preferably applied as a material in various molded articles.

Examples of molded article applications include household goods, OA equipment, AV equipment, battery electrical components, lighting devices, automotive part applications, housing applications, and sanitary applications, as well as a light guide plate, diffusion plate, polarizing plate protective film, ¼ wave plate, ½ wave plate, viewing angle control film, retardation film such as an optical compensation film, display front panel, display base, lens, and touch panel that are used in displays such as liquid crystal displays, plasma displays, organic EL displays, field emission displays, and rear projection televisions. Further, the inventive molded article can also be preferably used in a transparent substrate used in solar cells. In addition, inventive molded article can be used in waveguides, lenses, optical fibers, optical fiber coating material, LED lenses, lens covers and the like in the field of optical communication systems, optical switching systems, and measurement systems optical. Moreover, the inventive molded article can also be used as an improver in other resins.

The methacrylic resin according to the present embodiment, and molded article using a resin composition thereof, may also be subjected to a surface functionalization treatment, such as an antireflection treatment, a transparent conductivity treatment, an electromagnetic shielding treatment, a gas-barrier treatment.

EXAMPLES

The present invention will now be described using specific Examples and Comparative Examples. However, the present invention is not limited to these Examples.

[Raw Materials]

The raw materials used in the Examples and Comparative Examples are shown below.

Methyl methacrylate (MMA): Manufactured by Asahi Kasei Chemicals Corporation (added with 2.5 ppm of 2,4-dimethyl-6-t-butylphenol which is manufactured by CBC Co., Ltd., as a polymerization inhibitor)

Methyl acrylic acid ester (MA): Manufactured by Mitsubishi Chemical Corporation (added with 14 ppm of 4-methoxyphenol which is manufactured by Kawaguchi Chemical Industry Co., Ltd., as a polymerization inhibitor)

N-octylmercaptan: Manufactured by the Arkema Group

2-Ethylhexyl thioglycolate: Manufactured by the Arkema Group

Lauroyl peroxide: Manufactured by NOF Corporation

Calcium phosphate: Manufactured by Nippon Chemical Industrial Co., Ltd., used as a suspension agent Calcium carbonate: Manufactured by Shiraishi Kogyo Kaisha Ltd., used as a suspension agent Sodium lauryl sulfate: Manufactured by Wako Pure Chemical Industries, Ltd., used as a suspension agent <Measurement Method>

[I. Measurement of Resin Composition and Molecular Weight]

(1. Methacrylic Resin Compositional Analysis)

Compositional analysis of the methacrylic resin was carried out by pyrolysis gas chromatography and a mass spectrometry method.

Pyrolysis apparatus: Py-2020D, manufactured by Frontier Lab

Column: DB-1 (30 m length, 0.25 mm inner diameter, 0.25 liquid phase thickness)

Column temperature program: Hold for 5 min at 40° C., then increase temperature to 320° C. at rate of 50° C./min, and hold for 4.4 min at 320° C.

Pyrolysis furnace temperature: 550° C.

Column inlet temperature: 320° C.

Gas chromatography: GC6890 manufactured by Agilent

Carrier: Pure nitrogen, flow rate 1.0 ml/min

Injection method: Split method (split ratio 1/200)

Detector: Mass spectrometer Automass Sun, manufactured by JEOL Ltd.

Detection method: Electron impact ionization (ion source temperature: 240° C., interface temperature: 320° C.)

Sample: 10 μL Solution of 0.1 g of methacrylic resin in 10 cc of chloroform

The above-described sample was collected in a pyrolysis apparatus platinum sample cup, and vacuum-dried for 2 hours at 150° C. The sample cup was then placed in the pyrolysis furnace, and the sample was subjected to compositional analysis under the above-described conditions.

The composition ratio of the methacrylic resin was determined based on the peak area in total ion chromatography (TIC) of methyl methacrylate and methyl acrylate and the calibration curve of the following standard sample.

Preparation of calibration curve standard samples: 0.25% by mass of lauroyl peroxide and 0.25% by mass of n-octylmercaptan were charged into 50 g solutions of a total of five methyl methacrylate and methyl acrylate compositions mixed in ratios of, respectively, (methyl methacrylate/methyl acrylate)=(100% by mass/0% by mass), (98% by mass/2% by mass), (94% by mass/6% by mass), (90% by mass/10% by mass), and (80% by mass/20% by mass). Each of these mixed solutions was charged into a 100 cc glass ampoule, the air was purged with nitrogen, and the glass ampoules were sealed. The glass ampoules were put in a 80° C. water bath for 3 hours, and then placed in a 150° C. oven for 2 hours. The glass ampoules were cooled to room temperature, and then the glass was split open. The methacrylic resin therein was extracted, and subjected to compositional analysis.

A graph plotting the (area of the methyl acrylate)/(area of the methyl methacrylate+area of the methyl acrylate) obtained based on measurement of the above-described calibration curve standard samples and the charged ratio of methyl acrylate was used as the calibration curve.

(2. Measurement of the Weight Average Molecular Weight and Molecular Weight Distribution of the Methacrylic Resin)
Measurement apparatus: Gel permeation chromatography (LC-908) manufactured by Japan Analytical Industry Co., Ltd.
Column: One Jaigel-4H column and two Jaigel-2H columns connected in series.
In this column, high molecular weight elutes quickly, and low molecular weight elutes slowly.
Detector: RI (differential refraction) detector
Detection sensitivity: 2.4 µV/sec
Sample: Solution of 0.450 g of methacrylic resin in 15 mL of chloroform
Injection amount: 3 mL
Developing solvent: Chloroform, flow rate 3.3 mL/min Under the above-described conditions, the RI detection intensity based on the methacrylic resin elution time was measured.

The weight average molecular weight (Mw) and the molecular weight distribution (Mw/Mn) of the methacrylic resin were determined based on the region area of the GPC elution curve and the calibration curve.

As the calibration curves, the following 10 methacrylic resins (manufactured by EasiCal PM-1 Polymer Laboratories) having a known monodisperse weight average molecular weight and differing molecular weights were used.

Weight Average Molecular Weight

Standard Sample 1: 1,900,000
Standard Sample 2: 790,000
Standard Sample 3: 281,700
Standard Sample 4: 144,000
Standard Sample 5: 59,800
Standard Sample 6: 28,900
Standard Sample 7: 13,300
Standard Sample 8: 5,720
Standard Sample 9: 1,936
Standard Sample 10: 1,020

The GPC elution curve for polymer (II) alone was obtained by, when the polymer (I) having a weight average molecular weight of 5,000 to 50,000 and the polymer (II) having a weight average molecular weight of 60,000 to 350,000 are mixed, determining in advance the weight average molecular weight of polymer (I) alone by measuring the GPC elution curve of polymer (I), multiplying the ratio of polymer (I) that is present (herein, the charged ratio was used) by the GPC elution curve of polymer (I), and subtracting the detection intensity at that elution time from the GPC elution curve of the mixture of polymer (I) and polymer (II). Based on this, the weight average molecular weights of these polymers (II) were determined.

Further, the peak molecular weight (Mp) on the GPC elution curve was determined based on the GPC elution curve and the calibration curve, and the content of the molecular weight component 1/5 or less the Mp was determined in the following manner.

First, the region area of the GPC elution curve of the methacrylic resin (the area of the shaded portion in FIG. 2) was determined.

Next, the region area of the GPC elution curve was divided by the elution time corresponding to the 1/5 molecular weight of the Mp to determine the region area of the GPC elution curve corresponding to the molecular weight component 1/5 or less the Mp.

From the ratio between that area and the region area of the GPC elution curve, the ratio of the molecular weight component 1/5 or less the Mp was determined.

(3. Measurement of the Composition Ratio of the Vinyl Monomer Copolymerizable with Methyl Methacrylate in the High Molecular Weight Component and the Low Molecular Weight Component of the Methacrylic Resin)

In this measurement, the composition of the vinyl monomer copolymerizable with methyl methacrylate in the molecular weight component having a cumulative region area of 0 to 2% (high molecular weight component: Mh) and in the molecular weight component having a cumulative region area of 98 to 100% (low molecular weight component: Ml), respectively, was analyzed.

The cumulative region area (%) of the region area of the GPC elution curve is considered as being formed by the area of the GPC elution curve obtained by adding up the detection intensities corresponding to the respective elution times heading toward the finish of the elution time, in which point A in FIG. 4 is a cumulative region area (%) reference of 0%.

A specific example of the cumulative region area will be described with reference to FIG. 3.

In FIG. 3, point X is a point on the baseline and point Y is a point on the GPC elution curve at a given elution time.

The ratio of the area enclosed by the curve AY, line segment AX, and line segment XY to the region area of the GPC elution curve is taken as the value of the cumulative region area (%) at a given elution time.

The molecular weight component having a cumulative region area of 0 to 2% (high molecular weight component) and the molecular weight component having a cumulative region area of 98 to 100% (low molecular weight component were sampled from the column based on the corresponding elution time, and the compositions thereof were analyzed. This was performed using the same apparatus and under the same conditions as in the above-described (2. Measurement of the weight average molecular weight and molecular weight distribution of the methacrylic resin).

Sampling was carried out twice. 10 µL from the obtained samples was collected in a pyrolysis gas chromatography analysis and mass spectrometry method pyrolysis apparatus platinum sample cup used in the above-described (1. Methacrylic resin compositional analysis). Then, using a 100° C. vacuum drier, the collected sample was dried for 40 minutes.

The composition of the methacrylic resin corresponding to the sampled cumulative region area was determined under the same conditions as in the above-described (1. Methacrylic resin compositional analysis).

[II. Measurement of Produced Amount of Agglomerates]

A mixed solution including polymer fine particles obtained by polymerization was passed through a sieve having a 1.68 mm mesh to remove agglomerates. The obtained agglomerates were dried for 12 hours in an 80° C. drying oven, and their weight was then measured.

The produced amount of agglomerates (% by mass) was calculated by dividing the obtained weight by the total weight of the raw materials used to produce polymer (I) (raw materials (I)) and the raw materials used to produce polymer (II) (raw materials (II)).

[III. Measurement of Physical Properties]
(1. Measurement of Rupture Time Measured by a Cantilever Method)

Solvent resistance was evaluated by a measurement method based on the cantilever method illustrated in FIG. 1.
Injection molding machine: IS-100EN manufactured by Toshiba Machine
Injection molded article: 3.2 mm thick, 12.7 mm wide, 127 mm long
Injection Conditions
Molding temperature: 230° C.
Mold temperature: 60° C.
Injection pressure: 56 MPa
Injection time: 20 sec
Cooling time: 40 sec A molded article molded under the above conditions was kept in a decanter for 1 day so that it did not absorb water.

Then, using the jig illustrated in FIG. 1, a molded article 2 was arranged as illustrated in FIG. 1, a 3 kg weight 3 attached with a kite string 5 was attached as illustrated in FIG. 1, and a filter paper 4 containing ethanol was placed at the position illustrated in FIG. 1. The time it took from placing the filter paper 4 until the molded article 2 ruptured due to the weight 3 was measured.

The above-described measurement was carried out 10 times for each sample. The data for the maximum time and the minimum time were discarded, and the average time (seconds) for the remaining 8 measurements was calculated.

This value was used as an index for solvent resistance evaluation.

(2. Measurement of VICAT Softening Temperature)

Measurement was carried out using a 4 mm-thick test piece based on ISO 306 B50 to determine the VICAT softening temperature (° C.). This value was used as an index for heat resistance evaluation.

(3. Charpy Impact Strength (Unnotched))

Measurement was carried out using a 3.2 mm-thick test piece based on the ISO 179 standard.

(4. Evaluation of Yellowness Index Difference)

The yellowness index difference ΔYI was measured using the following equation, using 4 test pieces 3 mm thick, 20 mm wide, and 220 mm long laminated over each other, by measuring YI (yellowness index) in the 220 mm length direction based on JIS T7105 (plastic optical characteristics test method) using the colorimeter TC-8600A manufactured by Nippon Denshoku Industries Co., Ltd.

A test piece was produced using the IS-100EN manufactured by Toshiba Machine at a molding temperature set to 230° C. and a mold temperature set to 60° C.

ΔYI represents a degree of yellowing in a molded article. A smaller value indicates less yellowing.

Yellowness index difference ΔYI=YI–YIO

ΔYI=Yellowness index difference
YI=Molded article yellowness index
YIO=Air yellowness index Obtained ΔYI values that were 20 or less were evaluated as "⊚", values that were more than 20 and 25 or less were evaluated as "○", values that were more than 25 and 30 or less were evaluated as "Δ", and values that were more than 30 were evaluated as "X".

(5. Measurement of Angle of Repose)

Measurement was carried out using a powder tester manufactured by Hosokawa Micron Group.

The angle of repose was determined to be good in practice if it was 40° or less.

(6. Measurement of Average Particle Size)

The average particle size was determined by measuring the particle weight remaining on each sieve when sieving was performed based on JIS-Z8801 for 10 minutes at maximum vibration output using a sieve (JTS-200-45-44 (500 μm apertures), 34 (425 μm apertures), 35 (355 μm apertures), 36 (300 μm apertures), 37 (250 μm apertures), 38 (150 μm apertures), and 61 (pan), manufactured by Tokyo Screen) and the test sieve shaker TSK-B-1, and determining the particle size at which the weight reached 50%.

The content of the particles remaining on the pan that passed through the sieve having 150 μm particle size apertures (content of component having particle size less than 0.15 mm) was measured.

(7. Measurement of Moisture Content)

Measurement was carried out at a set temperature of 230° C. using the Karl Fischer method.

The method for producing the methacrylic resin will now be illustrated.

The blended amounts are shown in the following Table 1.

Further, the monomer blend composition, the polymer ratio, the measurement results of the weight average molecular weight of each polymer, and the polymerization conditions are shown in the following Table 2.

Example 1

Two (2) kg of water, 65 g of calcium phosphate, 39 g of calcium carbonate, and 0.39 g of sodium lauryl sulfate were charged into a vessel having a stirring device provided with four inclined paddle impellers to obtain a mixed solution (A).

Next, 26 kg of water was charged into a 60 L reactor, the temperature was increased to 80° C., and then the mixed solution (A) and the raw materials of polymer (I) in the blending amounts shown in the following Table 1 were charged therein.

Then, suspension polymerization was carried out by maintaining the temperature at about 80° C., and the exothermic peak 80 minutes after adding the polymer (I) raw materials was observed.

Subsequently, the temperature was increased to 92° C. at a rate of 1° C./min, and the 92° C. temperature was maintained for about 30 minutes.

Then, after the temperature was decreased to 80° C. at a rate of 1° C./min, the raw materials of polymer (II) were charged into the reactor in the blending amounts shown in the following Table 1. Next, suspension polymerization was carried out by maintaining the temperature at about 80° C., and the exothermic peak 120 minutes after adding the polymer (II) raw materials was observed.

Subsequently, the temperature was increased to 92° C. at a rate of 1° C./min and the solution was aged for 60 minutes, after which the polymerization reaction was essentially finished.

Next, the resultant mixture was cooled to 50° C., and then charged with 20% by mass of sulfuric acid to dissolve the suspension agent.

Next, the polymerization reaction solution was passed through a sieve having a 1.68 mm mesh to remove agglomerates, moisture was separated by filtration, and the obtained slurry was dewatered to obtain a bead-shaped polymer. The obtained bead-shaped polymer was washed with aqueous sodium hydroxide adjusted to a pH of about 8 to 9.5, then dewatered in the same manner as above, and then repeatedly further washed with deionized water and dewatered to obtain polymer particles.

The weight of the agglomerates was measured after drying for 12 hours in an 80° C. drying oven. The amount of produced agglomerates (% by mass) was measured by dividing this weight by the total weight of the raw materials (I) and raw materials (II), to give a value of 0.38% by mass.

The obtained polymer particles were dried for 12 hours in an 80° C. hot-air drying oven, and then removed from the drying oven. The angle of repose measured about 1 hour later was 29°.

Further, the average composition ratio Mh of the methyl acrylate in the methacrylic resin of the cumulative region area (%) 0 to 2% portion from the GPC region high molecular weight side was 2.5% by mass, the average composition ratio Ml of the methyl acrylate in the methacrylic resin of the cumulative region area (%) 98 to 100% portion of the GPC region was 0.4% by mass, and the average particle size was 0.29 mm.

The amount of particles remaining on the pan after passing through a sieve having particle size apertures of 150 μm was 2.3% by mass. Further, the water content of the obtained polymer particles was 0.56% by mass.

The obtained polymer particles were melt-kneaded with a φ30 mm twin-screw extruder set to 240° C., and the strands were cooled and cut to obtain resin pellets. It was confirmed that extrusion processability during this operation was good.

Table 2 shows the time T1 from adding the raw materials of polymer (I) in Example 1 until the exothermic peak was observed, as well as the retention temperature and retention time since the exothermic peak was observed, and also the time T2 from adding the raw materials of polymer (II) until the exothermic peak was observed and the value for (T2)/(T1). Further, the following Table 3 shows the measurement results of the agglomerate amount, angle of repose, pellet weight average molecular weight, ratio of the molecular weight component 1/5 or less the (Mp), the above Mh and Ml, Mw/Mn, average particle size, content of the components having a particle size of less than 0.15 mm, moisture content, and yellowness index difference.

Examples 2 to 17

Polymerization was carried out and polymer particles were obtained in the same manner as in Example 1, except that the raw materials shown in the following Table 1 were used.

Table 2 shows the time T1 from adding the raw materials of polymer (I) until the exothermic peak was observed, as well as the retention temperature and retention time since the exothermic peak was observed, and also the time T2 from adding the raw materials of polymer (II) until the exothermic peak was observed and the value for (T2)/(T1). Further, the following Table 3 shows the measurement results of the agglomerate amount, angle of repose, pellet weight average molecular weight, ratio of the molecular weight component 1/5 or less the (Mp), the above Mh and Ml, Mw/Mn, average particle size, content of the components having a particle size of less than 0.15 mm, moisture content, and yellowness index difference.

Resin pellets were obtained in the same manner as in Example 1. During this operation, the extrusion processability was good.

Further, the physical property measurement results of a molded article of the methacrylic resin from Examples 2, 3, 14, and 17 are shown in the following Table 5.

Comparative Example 1

Two (2) kg of water, 65 g of calcium phosphate, 39 g of calcium carbonate, and 0.39 g of sodium lauryl sulfate were charged into a vessel having a stirring device to obtain a mixed solution (A).

Next, 26 kg of water was charged into a 60 L reactor, the temperature was increased to 80° C., and then the mixed solution (A) and the raw materials of polymer (I) in the blending amounts shown in the following Table 1 were charged therein.

Then, suspension polymerization was carried out by maintaining the temperature at about 80° C., and the exothermic peak 40 minutes after adding the polymer (I) raw materials was observed.

Then, after holding for 30 minutes while maintaining at about 80° C., the raw materials of polymer (II) were charged into the reactor in the blending amounts shown in the following Table 1. Next, suspension polymerization was carried out by maintaining the temperature at about 80° C., and the exothermic peak 210 minutes after adding the polymer (II) raw materials was observed.

Subsequently, the temperature was increased to 92° C. at a rate of 1° C./min and the solution was aged for 60 minutes, after which the polymerization reaction was essentially finished.

Next, the resultant mixture was cooled to 50° C., and then charged with 20% by mass of sulfuric acid to dissolve the suspension agent.

Next, the polymerization reaction solution was passed through a sieve having a 1.68 mm mesh to remove agglomerates, and the obtained bead-shaped polymer was washed twice with pure water to obtain polymer particles.

The weight of the agglomerates was measured after drying for 12 hours in an 80° C. drying oven. The amount of produced agglomerates (% by mass) was measured by dividing this weight by the total weight of the raw materials (I) and raw materials (II), to give a value of 1.32% by mass.

The obtained polymer particles were dried for 12 hours in an 80° C. hot-air drying oven, and then removed from the drying oven. The angle of repose measured about 1 hour later was 45°.

The following Table 4 shows the angle of repose, agglomerate amount, pellet weight average molecular weight, ratio of the molecular weight component 1/5 or less the (Mp), the above Mh and Ml, Mw/Mn, average particle size, content of the components having a particle size of less than 0.15 mm, moisture content, and yellowness index difference of Comparative Example 1, and the results of evaluation thereof.

Further, the physical property measurement results of a molded article of the methacrylic resin from Comparative Example 1 are shown in the following Table 5.

The obtained polymer fine particles were melt-kneaded with a φ30 mm twin-screw extruder set to 240° C., and the strands were cooled and cut to obtain resin pellets. During this operation, since the polymer particles did not flow and remained in the hopper, the polymer particles were charged while appropriately hitting the hopper.

Further, the strands were not stable, and some of the strands snapped during the extrusion operation.

Comparative Examples 2 and 3

Polymerization was carried out in the same manner as in Comparative Example 1, except that the raw materials shown in the following Table 1 were used.

The following Table 2 shows the time T1 from adding the raw materials of polymer (I) until the exothermic peak was observed, the retention temperature and retention time since the exothermic peak was observed, and also the time T2 from adding the raw materials of polymer (II) until the exothermic peak was observed.

The following Table 4 shows the angle of repose, agglomerate amount, pellet weight average molecular weight, ratio of the molecular weight component 1/5 or less the (Mp), the above Mh and Ml, Mw/Mn, average particle size, content of the components having a particle size of less than 0.15 mm, moisture content, and yellowness index difference of Comparative Examples 2 and 3, and the results of evaluation thereof.

For Comparative Example 3, the physical property measurement results of the molded article are shown in the following Table 5.

Further, the obtained polymer fine particles were melt-kneaded with a φ30 mm twin-screw extruder set to 240° C., and the strands were cooled and cut to obtain resin pellets. During this operation, since the polymer particles did not flow and remained in the hopper, the polymer particles were charged while appropriately hitting the hopper.

TABLE 1

|  | Raw Material (I)/g | | | | Raw Material (II)/g | | | |
| --- | --- | --- | --- | --- | --- | --- | --- | --- |
|  | MMA | MA | Lauroyl Peroxide | 2-Ethylhexylthioglycolate | MMA | MA | Lauroyl Peroxide | n-Octylmercaptan |
| Example 1 | 6935 | 0 | 49.92 | 146.77 | 16176 | 416 | 22.46 | 26.29 |
| Example 2 | 5779 | 0 | 29.64 | 122.08 | 17338 | 446 | 21.39 | 29.24 |
| Example 3 | 5779 | 0 | 41.6 | 122.31 | 17338 | 446 | 21.39 | 29.24 |
| Example 4 | 5806 | 0 | 41.6 | 95.09 | 16989 | 802 | 24.07 | 13.37 |
| Example 5 | 5779 | 0 | 41.6 | 122.31 | 17078 | 713 | 21.39 | 16.58 |
| Example 6 | 3930 | 0 | 28.29 | 83.17 | 18900 | 789 | 23.68 | 18.35 |
| Example 7 | 3845 | 81 | 24.3 | 83.17 | 18505 | 1184 | 23.68 | 18.35 |
| Example 8 | 3948 | 0 | 28.29 | 64.66 | 18495 | 1184 | 23.68 | 38.55 |
| Example 9 | 3948 | 0 | 32.34 | 64.66 | 18495 | 1184 | 23.68 | 38.55 |
| Example 10 | 3948 | 0 | 19.72 | 64.66 | 18495 | 1184 | 38.68 | 38.55 |
| Example 11 | 2312 | 0 | 16.64 | 48.92 | 20060 | 1284 | 25.67 | 25.67 |
| Example 12 | 5563 | 0 | 39.57 | 49.49 | 16143 | 763 | 25.69 | 27.13 |
| Example 13 | 5522 | 0 | 39.57 | 90.43 | 16154 | 763 | 33.88 | 16.96 |
| Example 14 | 5522 | 0 | 39.57 | 90.43 | 16594 | 288 | 30.52 | 44.09 |
| Example 15 | 8125 | 128 | 128.37 | 176.12 | 14357 | 822 | 7.61 | 27.54 |
| Example 16 | 5761 | 0 | 59.43 | 122.31 | 17243 | 535 | 22.29 | 29.06 |
| Example 17 | 5100 | 0 | 39.22 | 91 | 18105 | 339 | 46.36 | 51.92 |
| Comparative Example 1 | 5238 | 0 | 87.48 | 142.16 | 15697 | 279 | 8.21 | 41.34 |
| Comparative Example 2 | 6380 | 0 | 20.44 | 135.03 | 14882 | 383 | 34.01 | 24.19 |
| Comparative Example 3 | 5225 | 0 | 14.45 | 110.08 | 15575 | 401 | 43.33 | 26.32 |

TABLE 2

|  | Polymer (I) | | | Polymer (II) | | | Polymer (I) Ratio/% By Mass | Polymer (II) Ratio/% By Mass |
| --- | --- | --- | --- | --- | --- | --- | --- | --- |
|  | Monomer Blend Composition/% By Mass | | Mw | Monomer Blend Composition/% By Mass | | Mw | | |
|  | MMA | MA | (×10000) | MMA | MA | (×10000) | | |
| Example 1 | 100 | 0 | 2.3 | 97.5 | 2.5 | 15.8 | 30 | 70 |
| Example 2 | 100 | 0 | 2.3 | 97.5 | 2.5 | 15.2 | 25 | 75 |
| Example 3 | 100 | 0 | 2.3 | 97.5 | 2.6 | 15.2 | 25 | 75 |
| Example 4 | 100 | 0 | 2.8 | 95.5 | 4.5 | 28.1 | 25 | 75 |
| Example 5 | 100 | 0 | 2.3 | 96.0 | 4.0 | 23.4 | 25 | 75 |
| Example 6 | 100 | 0 | 2.3 | 96.0 | 4.0 | 23.4 | 17 | 83 |
| Example 7 | 100 | 2 | 2.3 | 94.0 | 6.0 | 23.4 | 17 | 83 |
| Example 8 | 100 | 0 | 2.8 | 94 | 6.0 | 13.4 | 17 | 83 |
| Example 9 | 100 | 0 | 2.8 | 94 | 6.0 | 13.4 | 17 | 83 |
| Example 10 | 100 | 0 | 2.8 | 94 | 6.0 | 13.4 | 17 | 83 |
| Example 11 | 100 | 0 | 2.3 | 94.0 | 6.0 | 19.0 | 10 | 90 |
| Example 12 | 100 | 0 | 4.7 | 95.5 | 4.5 | 16.3 | 25 | 75 |
| Example 13 | 100 | 0 | 2.8 | 95.5 | 4.5 | 22.9 | 25 | 75 |
| Example 14 | 100 | 0 | 2.8 | 98.3 | 1.7 | 10.1 | 25 | 75 |
| Example 15 | 100 | 1.5 | 2.3 | 94 | 5.4 | 13.8 | 36 | 64 |
| Example 16 | 100 | 0 | 2.3 | 97 | 3 | 15.2 | 25 | 75 |
| Example 17 | 100 | 0 | 2.6 | 8.2 | 1.8 | 10.6 | 22 | 78 |
| Comparative Example 1 | 100 | 0 | 1.8 | 95.5 | 1.7 | 11.3 | 25 | 75 |
| Comparative Example 2 | 100 | 0 | 2.3 | 95.5 | 4.5 | 15.8 | 30 | 70 |
| Comparative Example 3 | 100 | 0 | 2.3 | 97.5 | 2.5 | 15.2 | 25 | 75 |

|  | Raw Material (I) Polymerization Time (T1)/Minutes | Retention Time/Minutes | Retention Temperature/° C. | Raw Material (II) Polymerization Time (T2)/Minutes | T2/T1 |
| --- | --- | --- | --- | --- | --- |
| Example 1 | 80 | 30 | 92 | 120 | 1.50 |
| Example 2 | 100 | 45 | 90 | 130 | 1.30 |
| Example 3 | 80 | 30 | 91 | 130 | 1.63 |

TABLE 2-continued

|  |  |  |  |  |  |
|---|---|---|---|---|---|
| Example 4 | 80 | 30 | 92 | 110 | 1.38 |
| Example 5 | 80 | 30 | 90 | 130 | 1.63 |
| Example 6 | 80 | 30 | 89 | 130 | 1.63 |
| Example 7 | 90 | 30 | 90 | 130 | 1.44 |
| Example 8 | 80 | 30 | 92 | 130 | 1.63 |
| Example 9 | 70 | 15 | 93 | 130 | 1.86 |
| Example 10 | 100 | 20 | 85 | 90 | 0.90 |
| Example 11 | 80 | 30 | 92 | 130 | 1.63 |
| Example 12 | 80 | 30 | 91 | 100 | 1.25 |
| Example 13 | 80 | 30 | 92 | 90 | 1.13 |
| Example 14 | 75 | 30 | 92 | 110 | 1.47 |
| Example 15 | 40 | 30 | 92 | 190 | 4.75 |
| Example 16 | 60 | 30 | 80 | 130 | 2.17 |
| Example 17 | 80 | 30 | 92 | 90 | 1.13 |
| Comparative Example 1 | 40 | 30 | 80 | 210 | 5.25 |
| Comparative Example 2 | 140 | 30 | 80 | 80 | 0.57 |
| Comparative Example 3 | 150 | 30 | 80 | 90 | 0.60 |

TABLE 3

|  | Angle of Repose (°) | Agglomerate Amount (% by mass) | Pellet Weight Average Molecular Weight (×10000) | Ratio (%) of Molecular Weight Component 1/5 or Less Mp | Ratio (%) of Components Having Molecular Weight of 10,000 or Less | High Molecular Weight Side 2% MA Mh (% by mass) | Low Molecular Weight Side 2% MA Ml (% By mass) |
|---|---|---|---|---|---|---|---|
| Example 1 | 29 | 0.38 | 11.8 | 25.3 | 4.5 | 2.5 | 0.4 |
| Example 2 | 27 | 0.23 | 11.9 | 22.8 | 4.1 | 2.5 | 0.6 |
| Example 3 | 28 | 0.23 | 11.9 | 22.8 | 4.1 | 2.5 | 0.5 |
| Example 4 | 25 | 0.44 | 21.8 | 25.6 | 3.4 | 4.5 | 0.8 |
| Example 5 | 26 | 0.33 | 18.1 | 24.9 | 3.9 | 4 | 0.6 |
| Example 6 | 27 | 0.28 | 19.8 | 21.8 | 3.5 | 4 | 0.5 |
| Example 7 | 31 | 0.38 | 20.4 | 21.9 | 3.5 | 6 | 2.5 |
| Example 8 | 29 | 0.25 | 11.6 | 16.1 | 3.2 | 6 | 0.6 |
| Example 9 | 33 | 0.34 | 11.8 | 15.9 | 3.1 | 6 | 0.6 |
| Example 10 | 36 | 0.67 | 11.7 | 15.7 | 3.1 | 6 | 0.6 |
| Example 11 | 29 | 0.23 | 17.3 | 16.3 | 3.6 | 6 | 0.8 |
| Example 12 | 26 | 0.28 | 13.4 | 13.1 | 1.7 | 4.5 | 1.3 |
| Example 13 | 26 | 0.31 | 17.9 | 23.9 | 3.7 | 4.5 | 0.9 |
| Example 14 | 28 | 0.32 | 8.3 | 11.7 | 4.9 | 1.7 | 0.8 |
| Example 15 | 39 | 0.98 | 9.3 | 14.2 | 8.3 | 5.2 | 2.2 |
| Example 16 | 31 | 0.42 | 11.8 | 22.9 | 4.2 | 2.5 | 0.6 |
| Example 17 | 30 | 0.38 | 8.2 | 11.8 | 5.2 | 1.8 | 0.7 |

|  | Mw/Mn | Average Particle Size (mm) | Content of Components Having a Particle Size of Less than 0.15 mm (% by mass) | Particle Moisture Content (% by mass) | ΔYI Evaluation | ΔYI |
|---|---|---|---|---|---|---|
| Example 1 | 3.5 | 0.3 | 2.3 | 0.56 | ◎ | 18.3 |
| Example 2 | 3.3 | 0.29 | 2.8 | 0.48 | ◎ | 19.2 |
| Example 3 | 3.3 | 0.29 | 2.2 | 0.46 | ◎ | 17.9 |
| Example 4 | 4.4 | 0.3 | 2.4 | 0.45 | ◎ | 18.2 |
| Example 5 | 3.9 | 0.3 | 2.2 | 0.52 | ◎ | 16.3 |
| Example 6 | 3.9 | 0.32 | 1.8 | 0.42 | ◎ | 15.2 |
| Example 7 | 3.9 | 0.3 | 2.3 | 0.58 | ◎ | 19.7 |
| Example 8 | 2.4 | 0.32 | 1.2 | 0.41 | ◎ | 16.4 |
| Example 9 | 2.4 | 0.33 | 0.9 | 0.38 | ◎ | 14.7 |
| Example 10 | 2.4 | 0.33 | 2.2 | 0.59 | ○ | 21.2 |
| Example 11 | 2.4 | 0.33 | 0.9 | 0.57 | ◎ | 19.3 |
| Example 12 | 2.4 | 0.3 | 2.1 | 0.4 | ◎ | 12.2 |
| Example 13 | 3.8 | 0.29 | 3.1 | 0.59 | ◎ | 18.9 |
| Example 14 | 2.3 | 0.29 | 3.4 | 0.36 | ◎ | 9.8 |
| Example 15 | 2.7 | 0.28 | 6.3 | 0.63 | Δ | 25.1 |
| Example 16 | 3.3 | 0.3 | 1.2 | 0.42 | ◎ | 11.4 |
| Example 17 | 2.2 | 0.3 | 1.5 | 0.39 | ◎ | 9.2 |

TABLE 4

| | Angle of Repose (°) | Agglomerate Amount (% by mass) | Ratio (%) of Molecular Weight Component ⅓ or Less Mp | Ratio (%) of Components Having Molecular Weight of 10,000 or Less | High Molecular Weight Side 2% MA Mh (mass %) | Low Molecular Weight Side 2% MA Ml (mass %) | Mw/Mn | Content of Components Having a Particle Size of Less than 0.15 mm (% by mass) | Particle Moisture Content (% by mass) | ΔYI Evaluation | ΔYI |
|---|---|---|---|---|---|---|---|---|---|---|---|
| Comparative Example 1 | 45 | 1.22 | 13.2 | 6.9 | 1.7 | 0.8 | 2.5 | 8.7 | 0.82 | X | 30.1 |
| Comparative Example 2 | 50 | 1.63 | 24.6 | 4.6 | 4.5 | 0.7 | 3.2 | 10.1 | 1.12 | X | 33.2 |
| Comparative Example 3 | 48 | 1.42 | 22.4 | 4.3 | 2.4 | 0.9 | 3.1 | 10.3 | 1.04 | X | 31.6 |

TABLE 5

| | Angle of Repose (°) | Agglomerate Amount (% by mass) | Charpy Impact Strength (kg/m²) | VICAT Softening Temperature (°C.) | Rupture Time/Seconds | ΔYI Evaluation | ΔYI |
|---|---|---|---|---|---|---|---|
| Example 2 | 27 | 0.23 | 24 | 109 | 85 | ◎ | 19.2 |
| Example 3 | 28 | 0.23 | 24 | 109 | 89 | ◎ | 17.9 |
| Comparative Example 3 | 48 | 1.42 | 21 | 108 | 67 | X | 31.6 |
| Example 14 | 28 | 0.32 | — | 109 | — | ◎ | 9.8 |
| Example 17 | 30 | 0.38 | — | 108 | — | ◎ | 9.2 |
| Comparative Example 1 | 45 | 1.22 | — | 106 | — | X | 30.1 |

Polymer particles having an angle of repose in a predetermined range, like those of the Examples, did not clog in the hopper during the extrusion operation, had good processability, and also exhibited a low molded article yellowness index. Further, a comparison of the Examples and the Comparative Examples showed that when the relationship between the time (T1) from adding the polymer (I) raw materials until the exothermic peak and the time (T2) from adding the polymer (II) raw materials until the exothermic peak satisfied the relational expression 0.6<T2/T1≤5, like in the Examples, the agglomerate amount is small, and a methacrylic resin having a small angle of repose can be obtained. Further, there were no flow defects in the hopper during the extrusion operation, and extrusion processability was excellent.

From Tables 3 to 5, it can be seen that by setting the relationship of the polymerization times in the range 0.6<T2/T1≤5, a methacrylic resin having a small angle of repose can be obtained. In addition, a comparison of Examples 2 and 3 with Comparative Example 3 showed that for the methacrylic resins obtained with the same blend composition, the methacrylic resin according to the present invention exhibits better colorless transparency, impact resistance, and solvent resistance, while maintaining high heat resistance, than a methacrylic resin polymerized for a polymerization time outside the range of the present invention.

The present application is based on Japanese Patent Application No. 2009-243856, which was filed with the Japan Patent Office on Oct. 22, 2009, Japanese Patent Application No. 2009-260278, which was filed with the Japan Patent Office on Nov. 13, 2009, and Japanese Patent Application No. 2009-295847, which was filed with the Japan Patent Office on Dec. 25, 2009, which are herein incorporated by reference in their entirety.

INDUSTRIAL APPLICABILITY

The methacrylic resin according to the present invention can be industrially applied as a molded article subjected to secondary processing, such as compressed air molding, vacuum molding, and blow molding, of a display (device) window in mobile phones, liquid crystal monitors, liquid crystal televisions and the like, a light guide plate used in liquid crystal displays, a plaque for a front plate of a display device, a painting and the like, a window that lets in external light, a display sign, the exterior of a car port roof and the like, a sheet for an exhibit, a shelf and the like, a lighting fixture cover, globe and the like, as well as an automotive optical part used in a taillight, headlight and the like that are thin and large in size, and require durability to solvents, such as alcohol-based cleaning agents, waxes, and wax removers.

| Reference Signs List | |
|---|---|
| 1 | Fixed jig |
| 2 | Test piece (molded article) |
| 3 | 3 kg Weight |
| 4 | Filter paper soaked in ethanol |
| 5 | Kite string |
| 6 | GPC elution curve (curve connecting the RI detection intensity at each elution time) |
| 7 | Baseline |

The invention claimed is:

1. A methacrylic resin, comprising:
   80 to 99.5% by mass of a methacrylic acid ester monomer unit; and
   0.5 to 20% by mass of other vinyl monomer unit which is copolymerizable with at least one of the methacrylic acid ester,
   wherein the methacrylic resin satisfies the following conditions (I) to (III):
   (I) having a weight average molecular weight measured by gel permeation chromatography (GPC) of 60,000 to 300,000;

(II) having a content of a molecular weight component 1/5 or less a peak molecular weight (Mp) obtained from a GPC elution curve, said content being 7 to 40% based on a region area ratio obtained from the GPC elution curve; and (III) having an angle of repose of 20 to 40°.

2. The methacrylic resin according to claim 1, wherein, using four 3 mm thick, 20 mm wide, and 220 mm long test pieces formed from the methacrylic resin laminated over each other, a yellowness index difference in a length direction when measured based on JIS T7105 is 30 or less.

3. The methacrylic resin according to claim 1, wherein the methacrylic resin has a moisture content measured by a Karl Fischer method of 0.1 to 1.0% by mass.

4. The methacrylic resin according to claim 1, wherein a content of a component having a molecular weight measured by gel permeation chromatography (GC) of 10,000 or less is 1 to 10% based on a region area ratio obtained from a GPC elution curve.

5. The methacrylic resin according to claim 1, wherein an average composition ratio Mh (% by mass) of the other vinyl monomer unit which is copolymerizable with the methacrylic acid ester in the methacrylic resin having a molecular weight component for which a cumulative region area of the region area obtained from the GPC elution curve is 0 to 2%, and an average composition ratio (Ml) (% by mass) of the other vinyl monomer unit which is copolymerizable with the methacrylic acid ester in the methacrylic resin having a molecular weight component for which the cumulative region area is 98 to 100%, the Mh and the Ml satisfy a relationship of the following relational expression (1):

$$(Mh-0.8) \geq Ml \geq 0 \tag{1}.$$

6. The methacrylic resin according to claim 1, wherein the methacrylic resin has an average particle size of 0.1 or more and 10 mm or less.

7. The methacrylic resin according to claim 1, wherein a content of components in the methacrylic resin having a particle size of less than 0.15 mm is 0.01 to 10% by mass.

8. The methacrylic resin according to claim 1, wherein a content of an agglomerate is 1.2% by mass or less.

9. A molded article obtained by molding the methacrylic resin according to any one of claims 1 to 8.

10. A method for producing a methacrylic acid ester monomer-containing methacrylic resin according to any one of claims 1 to 8, the method comprising the steps of:

producing, based on the whole methacrylic resin, 5 to 45% by mass of a polymer (I) from a methacrylic acid ester monomer-containing raw material mixture, the polymer (I) having an weight average molecular weight of 5,000 to 50,000 measured by gel permeation chromatography; and producing, based on the whole methacrylic resin, 95 to 55% mass of a polymer (II) having an weight average molecular weight of 60,000 to 350,000 by further adding, in the presence of the polymer (I), a methacrylic acid ester monomer-containing raw material mixture, wherein when a time from adding the raw material mixture of polymer (I) until observing an exothermic peak temperature from heat generated by polymerization is (T1), and a time from adding the raw material mixture of polymer (II) until observing an exothermic peak temperature from heat generated by polymerization is (T2), the following expression (6) holds true:

$$0.6 < T2/T1 \leq 5 \tag{6}.$$

11. The method for producing the methacrylic resin according to claim 10, wherein a composition ratio Ma1 (% by mass) of the other vinyl monomer which is copolymerizable with a methacrylic acid ester in polymer (I), and a composition ratio Mah (% by mass) of the other vinyl monomer unit which is copolymerizable with a methacrylic acid ester in polymer (II), the Ma1 and the Mah satisfy a relationship of the following expression (4):

$$(Mah-0.8) \geq Ma1 \geq 0 \tag{4}.$$

12. The method for producing the methacrylic resin according to claim 10, wherein the polymer (I) substantially does not comprise the other vinyl monomer unit which is copolymerizable.

13. A methacrylic resin, comprising:

80 to 99.5% by mass of a methacrylic acid ester monomer unit; and 0.5 to 20% by mass of other vinyl monomer unit which is copolymerizable with at least one of the methacrylic acid ester, wherein the methacrylic resin has a moisture content measured by a Karl Fischer method of 0.1 to 1.0% by mass and the methacrylic resin satisfies the following conditions (I) to (III):

(I) having a weight average molecular weight measured by gel permeation chromatography (GPC) of 60,000 to 300,000;

(II) having a content of a molecular weight component 1/5 or less a peak molecular weight (Mp) obtained from a GPC elution curve, said content being 7 to 40% based on a region area ratio obtained from the GPC elution curve; and (III) having an angle of repose of 20 to 40°.

* * * * *